United States Patent
Munshi

(10) Patent No.: US 6,664,006 B1
(45) Date of Patent: *Dec. 16, 2003

(54) ALL-SOLID-STATE ELECTROCHEMICAL DEVICE AND METHOD OF MANUFACTURING

(75) Inventor: M. Zafar A. Munshi, Missouri, TX (US)

(73) Assignee: Lithium Power Technologies, Inc., Manvel, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/388,733

(22) Filed: Sep. 2, 1999

(51) Int. Cl.[7] ............... H01M 10/40; H01M 10/38; H01M 6/18; H01M 4/66
(52) U.S. Cl. ............... 429/305; 429/306; 429/309; 429/310; 429/312; 429/313; 429/314; 429/316; 429/319; 429/320; 429/321; 429/322; 429/323; 429/233; 429/234; 429/162; 29/623.1; 29/623.3; 29/623.5
(58) Field of Search ............... 429/304–307, 429/309–314, 316, 317, 319–323, 94, 188, 189, 211, 233, 234, 162; 29/623.1, 623.3, 623.5; 252/62.2

(56) References Cited

U.S. PATENT DOCUMENTS

| | | | |
|---|---|---|---|
| 3,734,876 A | 5/1973 | Chu | 260/33.6 |
| 4,164,068 A | 8/1979 | Shropshire et al. | 29/623.1 |
| 4,505,997 A | 3/1985 | Armand et al. | 429/192 |

(List continued on next page.)

FOREIGN PATENT DOCUMENTS

| | | | |
|---|---|---|---|
| EP | 0379372 A | 7/1990 | H01M/6/18 |
| EP | 0390557 | 10/1990 | H01M/10/40 |
| EP | 0411693 | 2/1991 | C08K/3/00 |
| EP | 0 741 426 | 11/1996 | H01M/4/04 |
| EP | 0766329 | 4/1997 | H01M/6/18 |
| EP | 893836 | * 1/1999 | |
| EP | 0 986 122 A2 | 3/2000 | H01M/6/18 |
| GB | 2326269 | * 12/1998 | |
| JP | 07082450 | 3/1995 | C08L/33/00 |
| WO | WO 99/27593 | 6/1999 | H01M/4/64 |

OTHER PUBLICATIONS

C. Capiglia, et al., "Effects of nanoscale SiO2 on the thermal and transport properties of solvent–free, poly(ethylene oxide) (PEO)–based polymer electrolytes," Solid State Ionics 118 (1–2), Mar. 1999, pp. 73–79.*

(List continued on next page.)

Primary Examiner—Randy Gulakowski
Assistant Examiner—Jonathan Crepeau
(74) Attorney, Agent, or Firm—Conley Rose, P.C.

(57) ABSTRACT

All-solid-state electrochemical cells and batteries employing very thin film, highly conductive polymeric electrolyte and very thin electrode structures are disclosed, along with economical and high-speed methods of manufacturing. A preferred embodiment is a rechargeable lithium polymer electrolyte battery. New polymeric electrolytes employed in the devices are strong yet flexible, dry and non-tacky. The new, thinner electrode structures have strength and flexibility characteristics very much like thin film capacitor dielectric material that can be tightly wound in the making of a capacitor. A wide range of polymers, or polymer blends, characterized by high ionic conductivity at room temperature, and below, are used as the polymer base material for making the solid polymer electrolytes. The preferred polymeric electrolyte is a cationic conductor. In addition to the polymer base material, the polymer electrolyte compositions exhibit a conductivity greater than $1 \times 10^{-4}$ S/cm at 25° C. or below and contain an electrically conductive polymer, a metal salt, a finely divided ionic conductor, and a finely divided inorganic filler material. Certain rechargeable batteries of the invention provide high specific energy (250 to 350 Wh/kg) (gravimetric) and energy density (450 to 550 Wh/l) (volumetric), high cycle life (1000 cycles), low self-discharge and improved safety.

49 Claims, 3 Drawing Sheets

U.S. PATENT DOCUMENTS

| | | | |
|---|---|---|---|
| 4,654,279 A | 3/1987 | Bauer et al. | 429/192 |
| 4,737,422 A | 4/1988 | Knight et al. | 429/192 |
| 4,792,504 A | 12/1988 | Schwab et al. | 429/192 |
| 4,794,059 A | 12/1988 | Hope et al. | 429/192 |
| 4,808,496 A | 2/1989 | Hope et al. | 429/192 |
| 4,830,939 A | 5/1989 | Lee et al. | 429/192 |
| 4,911,995 A | 3/1990 | Bélanger et al. | 429/192 |
| 4,960,655 A | 10/1990 | Hope et al. | 429/192 |
| 4,970,012 A * | 11/1990 | Kuroda et al. | 252/182.27 |
| 4,990,413 A | 2/1991 | Lee et al. | 429/191 |
| 5,006,431 A | 4/1991 | Hope et al. | 429/192 |
| 5,019,467 A | 5/1991 | Fujiwara | 429/127 |
| 5,030,527 A | 7/1991 | Carpio et al. | 492/192 |
| 5,047,300 A | 9/1991 | Juergens | 429/94 |
| 5,057,385 A | 10/1991 | Hope et al. | 429/162 |
| 5,100,746 A | 3/1992 | Muller et al. | 429/94 |
| 5,102,752 A | 4/1992 | Hope et al. | 429/192 |
| 5,196,484 A | 3/1993 | Giles et al. | 525/314 |
| 5,238,759 A | 8/1993 | Plichta et al. | 429/192 |
| 5,281,682 A | 1/1994 | Cornforth et al. | 526/273 |
| 5,296,318 A | 3/1994 | Gozdz et al. | 429/192 |
| 5,360,684 A | 11/1994 | Duval et al. | 429/162 |
| 5,415,948 A | 5/1995 | Gauthier et al. | 429/62 |
| 5,423,110 A | 6/1995 | Gauthier et al. | 29/2 |
| 5,516,339 A | 5/1996 | Bailey | 29/623.1 |
| 5,521,023 A | 5/1996 | Kejha et al. | 429/142 |
| 5,522,028 A | 5/1996 | Gauthier et al. | 429/234 |
| 5,552,239 A | 9/1996 | Gozdz et al. | 429/94 |
| 5,631,103 A | 5/1997 | Eschbach et al. | 429/192 |
| 5,639,573 A | 6/1997 | Oliver et al. | 429/190 |
| 5,695,873 A | 12/1997 | Kumar et al. | 428/325 |
| 5,705,084 A * | 1/1998 | Kejha | 252/62.2 |
| 5,834,137 A * | 11/1998 | Zhang et al. | |
| 6,001,509 A * | 12/1999 | Kim et al. | 429/309 |
| 6,007,935 A | 12/1999 | Gauthier et al. | 429/66 |
| 6,030,421 A | 2/2000 | Gauthier et al. | 29/623 |
| 6,060,185 A * | 5/2000 | Okutoh | 429/7 |
| 6,159,638 A | 12/2000 | Takatera et al. | 429/309 |
| 6,187,062 B1 * | 2/2001 | Oweis et al. | 29/623.1 |

OTHER PUBLICATIONS

Doddapaneni, Narayan, "Technology Assessment of Ambient Temperature Rechargeable Lithium Batteries for Electric Vehicle Applications," report from Sandia National Laboratories for the U.S. Department of Energy, Washington, D.C. (Jul. 1991), DE91–016500, pp. 3, 5, 7, 35, and 37 excerpt.

Armstrong, R.D. et al., "Conductivity Cell for Temperature Cycling of Polymer Electrolytes," Solid State Ionics 11, North–Holland, Amsterdam (1984), pp. 301–303 (Month N/A).

Armand, M.B., "Ionically Conductive Polymers," Solid State Batteries Eds. A. Hooper and C.A.C. Sequeira, NATO ASI Series, Martinus Nijhoff Publishers, Dordrect, The Netherlands (1985), pp. 63–75 (Month N/A).

Johnson, W.B. et al., "Electrochemical Cell Investigations of $Li_xTiS_2$ and $Li_xNa_yTiS_2$ Using a Polymer Electrolyte," Solid State Ionics 5, North Holland, Amsterdam (1981), pp. 367–370 (Month N/A).

Munshi, M.Z.A. et al., "Assessment of Thin Film Batteries Based on Polymer Electrolytes. I. Energy Density," Solid State Ionics 38, North–Holland, Amsterdam (1990), pp. 87–94, (Month N/A).

Owens, B.B. et al., "Ambient Temperature Solid State Batteries," 8th Annual International Conference on Solid State Ionics, Lake Louise, Banff, Canada (Oct. 1991), 18 pages.

Prasad, P.S.S. et al., "Ambient Temperature Solid Polymer Electrolyte Devices," 7th Annual International Conference on Solid State Ionics, Hakone, Japan (1989), 19 pages (Month N/A).

Croce, F. et al., "Characteristics of a poly(ethylene oxide)–$LiBF_4$ polymer electrolyte," J. Applied Electrochem. 18 (1988), pp. 401–404 (Month N/A).

Abraham, K.M. et al., "Dimensionally Stable MEEP–Based Polymer Electrolytes and Solid–State Lithium Batteries," report from Office of Naval Research, Contract No. N00014–87–C–0857, R&T Code: 400o010 sbi01, Final Report, Studies of the Fundamentals of Solid State Batteries, EIC Laboratories, Inc., Norwood, MA (Nov. 1990), AD–A228772, pp. 1–29.

Einset, A.G. and G.E. Wnek "Polymer Electrolyte Review," Chapter 15 in the Handbook of Solid State Batteries and Capacitors, Ed. M. Z. A.Munshi (World Scientific Pub. Singapore) 1995. (No month).

Naoi, K. and M.Z.A. Munshi "Modeling of Conducting Polymer Batteries and Capacitors," Chapter 17 in the Handbook of Solid State Batteries and Capacitors, Ed. M. Z. A.Munshi (World Scientific Pub. Singapore) 1995. (No month).

Doddapaneni, N., G. Nagasubramanian and D. Ingersoll "Solid–State Rechargeable Lithium Batteries for Electric Vehicle Applications," Chapter 18 in the Handbook of Solid State Batteries and Capacitors, Ed. M. Z. A.Munshi (World Scientific Pub. Singapore) 1995. (No month).

Munshi, M.Z.A. "Technology Assessment of Lithium Polymer Electrolyte Secondary Batteries," Chapter 19 in the Handbook of Solid State Batteries and Capacitors, Ed. M. Z. A.Munshi (World Scientific Pub. Singapore) 1995 (No month).

Munshi, M.Z.A., and Owens, B.B., "Assessment of Thin Film Batteries Based on Polymer Electrolytes. I. Energy Density," Solid State Ionics, vol. 38, pp. 87–94, 1990, North Holland (No month).

Munshi, M.Z.A., and Owens, B.B., "Assessment of Thin Film Batteries Based on Polymer Electrolytes. II. Pulse Power Density," Solid State Ionics, vol. 38, pp. 95–101, 1990, North Holland, (No month).

Munshi, M.Z.A., and Owens, B.B., "Assessment of Thin Film Batteries Based on Polymer Electrolytes. III. Specific Energy Versus Specific Power," Solid State Ionics, vol. 38, pp. 103–107, 1990, North Holland (No month).

Visco, Steven J. and DeJonghe, Lutgard C., "Advanced Batteries Based on Organosulfur Redox Chemistry", Handbook of Solid State Batteries and Capacitors: Ed. M.Z.A. Munshi, Ch. 22, World Scientific, Singapaore, 1995 (No month).

Kumar B. et al: Polymer–Ceramic Composite Electrolytes; Journal of Power Sources, Elsevier Sequoia S.A. Lausanne, CH, vol. 52 No. 2, Dec. 1, 1994, pp. 261–268 XP004044634 ISSN:0378–7753.

F. Capuano and Al: Composite Polymer Electrolytes, Journal of Electrochemical, Society, vol. 138, No. 7, 1991, pp. 1918–1922, XP002175399 (No month).

Krawiec W Et Al: Polymer Nanocomposites: A New Strategy for Synthesizing Solid Electrolytes for Rechargeable Lithium Batteries, Journal of Power Sources, Elsevier Sequoia S.A. Lausanne, CH, vol. 54, No. 2, Apr. 1, 1995, pp. 310–315 XP004044428 ISSN: 0378–7753.

PCT Search Report —PCT/US00/22915, Published as WO 01/17051, Mar. 8, 2001.

* cited by examiner

ALL-SOLID-STATE ELECTROCHEMICAL DEVICE AND METHOD OF MANUFACTURING

CROSS-REFERENCE TO RELATED APPLICATIONS

This application is related to contemporaneously filed U.S. Pat. App. Ser. No. 09/388,741 entitled "Solid Polymer Electrolytes," the disclosure of which is incorporated herein by reference.

STATEMENT REGARDING FEDERALLY SPONSORED RESEARCH OR DEVELOPMENT

Not Applicable

BACKGROUND OF THE INVENTION

1. Field of the Invention

The present invention generally relates to the manufacture of solid state electrochemical cells, particularly high energy density cells having very thin electrode and electrolyte structures for building ultra-thin laminar batteries. The invention also relates to lithium polymer electrolyte batteries containing such electrochemical cells and to their methods of making.

2. Description of the Related Art

Lithium rechargeable batteries are the focus of intense investigation around the world because of the rapid proliferation of portable electronic devices in the international marketplace. The state-of-the-art lithium battery is a lithium ion battery which uses a carbon electrode as the negative electrode or anode and a lithiated metal oxide, such as lithiated cobalt oxide, lithiated nickel oxide, lithiated manganese oxide, or mixtures of these materials as the positive electrode or cathode, a microporous polypropylene or polyethylene separator that separates the two electrodes and prevents them from shorting electrically, and liquid organic solvents containing a lithium salt as the electrolyte. The electrolyte is usually absorbed into the separator material and provides high ionic conductivity ($10^-$ to $10^{-2}$ S/cm) and migration of ions between the electrodes of the cell. These batteries are commercially available and are commonly used in portable computers, cellular telephones and camcorders among other applications. The specific energy and energy density of the lithium ion battery is usually about 125 Wh/kg and 260 Wh/l. Usually, the packaged battery (in a hard plastic case) has a much lower energy density than the individual cell (20% lower). The cycle life (number of times the battery can be recharged) of this battery is about 500 to 800 cycles, the self-discharge (i.e. loss of capacity on standing) per month is about 10%, and cost is about $1 per Watt-hour of energy. These batteries can be manufactured at a high rate of speed. Even though this battery technology is being commercialized very heavily, there have been numerous safety questions. Cells that have been abused under crush test or high temperature test have been known to explode and catch fire.

An offshoot of the above system is the lithium ion polymer electrolyte battery. The electrode chemistry is the same, but the liquid electrolyte (up to 70% by weight of the electrolyte) in this case is absorbed in a polymer membrane instead of the microporous polypropylene separator. It is based on the Bellcore's U.S. Pat. No. 5,296,318 utilizing a polyvinylidene fluoride (PVDF) polymer as the medium that absorbs the electrolyte solvent. Ironically, PVDF is non-conducting and so its sole function is to hold the liquid organic solvent(s) in its structure in a manner similar to a sponge holding water. Because the technology uses an electrolyte solvent absorbed in a polymer, it is not easy to manufacture cells in high speed. Automation of this technology may be very difficult. It is believed the energy densities (gravimetric and volumetric) for this type of battery are lower than the existing lithium ion batteries, cycle life is not too impressive, and cell cost is several dollars per Watt-hour. The physical forms the lithium ion polymer cell could take was a heavily touted feature, but today only flat prismatic cells are typically manufactured.

Another rechargeable lithium battery system uses a lithium metal as the negative electrode instead of carbon, and so the energy density of this system can be increased tremendously because of the very high specific capacity of metallic lithium compared to carbon. Gravimetric specific energy density as high as 200 to 250 Wh/kg have been reported in the literature for rechargeable lithium metal batteries. Lithium metal anode batteries are not new. Primary, non-rechargeable batteries using lithium metal, non-aqueous organic electrolytes and a positive electrode have been used in many applications for the past 25 years despite the fact that lithium metal is thermodynamically unstable in liquid organic solvents and reacts with the solvent irreversibly. Secondary batteries using lithium metal as the negative electrode, intercalation or insertion compounds as the positive electrode, and non-aqueous organic electrolytes were the focus of intense investigation during the 1970's and 1980's. However, the problem with using lithium in a rechargeable system is that because of the instability of lithium in these solvents, a large excess of lithium is required to off-set the chemical reaction of lithium with the solvent, usually as much as 3 to 5 fold. In addition, the cycle life of lithium metal batteries in organic solvent electrolytes is less than 200 cycles. Lithium plating and stripping during the charge and discharge cycles creates a porous deposit of very high surface area and increased activity of the lithium metal with respect to the electrolyte. The reaction is highly exothermic and the cell can vent with flame if heated or short-circuited. Much effort has been expended to improve the cycling efficiency of the lithium anode through changes to the electrolyte or investigating alloys of lower lithium reactivities. Safety features such as fusible separators which cease the electrochemical reactions when the battery temperature approaches a critical value and overcharge protection redox couples have also been incorporated to improve the safety of these cells.

In addition, liquid solvent electrolyte in any of the above cell systems is often corrosive and toxic and presents handling difficulties through spillage or leakage from the cell. It can also outgas during overcharge or overdischarge or at elevated temperatures, leading to safety problems. Most of the problems have been associated with the electrode/electrolyte interface.

In order to overcome the disadvantages inherent in liquid electrolytes and to obtain superior long-term storage stability there is interest in solid polymeric electrolytes in which ion mobility is achieved through coordination by sites on the polymer chain of electrolyte ions, thus promoting electrolyte dissolution and salt dissociation. An all-solid-state battery using an ionically conductive polymer membrane as the electrolyte would have several attractive features. It could be made into virtually any shape and size, be reasonably rugged and leakproof, and would have low self-discharge. It could be made into thin film power cells or thick film energy cells, would have high open-circuit potentials using a lithium anode, and could be produced by automated fabrication techniques. These features represent a unique combination of properties and give rise to the possibility of using such batteries, as either secondary or primary devices across a wide range of applications.

One polymer that has been examined extensively for use in a solid state battery is poly(ethylene oxide) or PEO, which is able to form stable complexes with a number of salts. Because of its low ionic conductivity at ambient temperature of about $10^{-9}$ to $10^{-8}$ S/cm, batteries examined using this material had to operate at 100° C. and above. A major problem with PEO based electrolytes at temperatures below 60° C. is their high crystallinity and the associated low ion mobility. In recent years a number of radically different approaches have been taken to improve the conductivity of PEO and PEO-based polymers that have also led to the proposal of other polymers. These approaches included, polymer modifications and synthesizing new polymers; forming composite polymers with ceramic materials; using plasticizer salts to increase the ion transport and mobility of the cation; using plasticizing solvents in the polymer again to increase the ionic character of the cation; among other approaches. Several review articles describe these approaches in detail, e.g. "Technology Assessment of Lithium Polymer Electrolyte Secondary Batteries" by M. Z. A. Munshi, Chapter 19 in Handbook of Solid State State Batteries and Capacitors, Ed. M. Z. A. Munshi (World Scientific Pub. Singapore) 1995; A. Hooper, M. Gauthier, and A. Belanger, in: "Electrochemical Science and Technology of Polymers—2, Ed. R. G. Linford (Elsevier Applied Science, London), 1987.

Polymer modification and synthesis of new polymers resulted in some improvement in the ionic conductivity but the mechanical property and integrity were poor. Probably, the best known polymer as a result of this synthesis is poly(bis(methoxyethoxyethoxide))-phosphazene, known as MEEP, which has an ionic conductivity of about $10^{-5}$ S/cm at room temperature when combined with a lithium salt, but which has mechanical properties similar to glue. On the other hand, materials based on blocked copolymers may provide alternatives. For example, PEO-PPO-PEO crosslinked with trifunctional urethane and a lithium salt has an ionic conductivity of about $10^{-5}$ S/cm but is too rigid, brittle and difficult to manufacture.

Inorganic conducting and non-conducting fillers have also been used to increase the ionic conductivity and mechanical property of the polymer. Addition of alpha alumina to $(PEO)_8.LiClO_4$ resulted in a negligible effect on the ionic conductivity but dramatically increased the mechanical property at 100° C., while the addition of other ceramic materials such as ionically conductive beta alumina to PEO-NaI and PEO-LiClO$_4$ complexes improved the ionic conductivity of PEO based electrolytes to about $10^{-5}$ S/cm In another battery technology, inorganic fillers based on high surface area alumina and silica have been used to enhance the ionic conductivity of lithium iodide solid electrolyte from $10^{-7}$ S/cm to $10^{-5}$–$10^{-4}$ S/cm at room temperature (see C. C. Liang, *J. Electrochemical Society*, Vol. 120, page 1289 (1973)). Plasticizer salts based on lithium bis (trifluoromethane sulfonyl) imide, $LiN(CF_3SO_2)_2$ trademarked as LiTFSI by Hydro-Quebec and distributed by the 3M Company under the product name, HQ-115 when added to PEO yields a conductivity of about $10^{-5}$ S/cm.

None of the previous approaches toward improving polymer conductivity has resulted in adequate conductivity enhancements of the polymer electrolytes to permit room temperature operation of batteries utilizing the electrolyte. Accordingly, an attempt was made to increase the ionic conductivity of PEO-based polymer electrolyte by incorporating plasticizing solvents or low molecular weight polymers to the polymer electrolyte. The intent was to increase the ionic mobility and concentrations of the charge carriers in the solid polymer electrolyte by enhancing the dissociation of the lithium salt. Generally, it is believed that the lithium ion is also solvated to the solvent molecule and participates in enhancing the ionic mobility. Many electrolyte composites incorporating low molecular weight polymers or liquid organic solvents have been prepared and have demonstrated high conductivity at room temperature approaching conductivity values of the typical non-aqueous liquid electrolytes. For example, Kelly et al. (*J Power Sources*, 14:13 (1985)) demonstrate that adding 20 mole percent of liquid polyethylene glycol dimethyl ether polymer (PEGDME) to solid PEO polymer results in an increase in the ionic conductivity of the final plasticized polymer from $3 \times 10^{-7}$ S/cm to $10^{-4}$ S/cm at 40° C. However, the mechanical property of this material was very poor.

Bauer et al in U.S. Pat. No. 4,654,279 (1987) demonstrate that thermal crosslinking of polymers consisting of epoxies and methacrylates and plasticized with a solution of LiClO$_4$ in a 400 MW PEG resulted in a conductivity of $4 \times 10^{-4}$ S/cm at 25° C. This patent describes a polymeric electrolyte consisting of a two phase interpenetrating network (IPN) of a mechanically supporting phase of a continuous network of a cross-linked polymer and an ionically conducting phase comprising of a metal salt and a liquid polymer such as liquid PEG.

Many of these low molecular weight polymers have a relatively low dielectric constant when compared to their liquid solvent counterpart, and thus limit the number of charge carriers in the plasticized polymer. In an effort to overcome this hindrance, high dielectric constant liquid organic solvent such as ethylene carbonate (EC) and propylene carbonate (PC) have been incorporated in the host polymer both to increase the number of charge carriers and increase further the room temperature conductivity of the polymer. The use of these organic solvents to plasticize polymers such as poly(vinyl acetal), poly(acrylonitrile), poly(vinyl acetate) and hexafluoropropenevinylidene fluoride copolymer (Viton™) were made as early as 1975 by Feuillade and Perche (*Journal of Applied Electrochemistry*, Vol. 5, page 63 (1975)). However, the mechanical properties of these polymers were so poor that they had to be supported on porous matrices. Later Armand (*Proc. Workshop on Li Non-Aqueous Battery Electrochemistry, The Electrochemical Soc.* Vol. 80–7, page 261 (1980)) by crosslinking Viton™ and plasticizing with a solution of 1M LiClO$_4$ in PC produced a system with good room temperature conductivity ($10^{-4}$ S/cm) and good mechanical properties. Polyvinylidene fluoride (PVDF) and polyacrylonitrile (PAN) were evaluated in the early 1980s and have also been doped with a variety of liquid polar solvents, yielding room temperature conductivities as high as $10^{-3}$ S/cm. Subsequently, PVDF has been the subject of a recent patent from Bellcore (U.S. Pat. No. 5,296,318).

The use of PC in an ionically conductive matrix containing oxygen donor atoms such as PEO complexed with a lithium salt was first presented by the present inventor in a paper presented at the Fall Meeting of the Electrochemical Soc. held Oct. 18–23, 1987). Although room temperature battery performance data was presented at that time, the propylenecarbonate/lithium salt/polymer electrolyte did not have good mechanical properties. In the late 1980s through early 1990s, a series of U.S. patents including U.S. Pat. Nos. 4,792,504; 4,747,542; 4,792,504; 4,794,059; 4,808,496;

4,816,357; 4,830,939; 4,861,690; 4,925,751; 4,925,752; 4,935,317; 4,960,655; 4,990,413; 4,997,732; 5,006,431; 5,030,527; 5,057,385; 5,066,554 and European patents EP 0 359 524 and EP 0 411 949 were issued variously to MHB Inc. and Hope Industries. These patents described predominantly radiation curing methods for the preparation of interpenetrating polymeric networks containing various types of polyacrylates and liquid organic solvents. Although electron beam curing was the preferred method for polymerizing the IPN, thermal and ultraviolet curing methods were also proposed. The idea behind this was to contain the PC solution in the matrix of the polymeric network that would therefore yield a high ionic conductivity comparable to that of PC itself Indeed, this was demonstrated in typical polymeric networks, yielding conductivities of about $2 \times 10^{-3}$ S/cm at room temperature. An advantage with using electron beam curing compared to UV radiation is that an electron beam can penetrate through metallic components, and hence complete prototype cells can be made in-situ.

While the addition of organic plasticizers may help solve the problem of low ionic conductivity in polymer electrolytes, they necessarily introduce additional electrolyte components that may have deleterious effects on other electrolyte properties, such as stability in contact with metallic lithium. Like the liquid organic electrolytes, plasticized polymer electrolyte is not thermodynamically stable at the lithium metal potential. In addition, polymer electrolytes based on such designs cannot be manufactured in very thin film form so as to reduce their overall resistance and hence cell resistance, since the polymer will not have the sufficient strength to hold the liquid organic solvents in its matrix. For such a system to be fully functional it must be based on a thick film concept, which increases its overall cell resistance and reduces the energy density due to a reduction in the active components in the cell. Another problem with this type of design is the fact that polymers containing liquids cannot be wound along with the rest of the electrode components in a winding machine, since the liquid will tend to ooze out of the polymer as soon as any stress is applied to the polymer.

Advanced commercial battery technologies such as the lithium ion (Sony type), THINFILM™ lead-acid (Bolder Battery Co.), and nickel-metal hydride batteries do not demonstrate very high cycle life, i.e., several tens of thousands of cycles. This is due primarily to considerable phase changes and composite structure segregation that take place within the electrode, inefficient materials utilization and particle movements, and expansion and contraction during charge and discharge. However, batteries such as these do represent a breakthrough in the design of lithium ion batteries and yielded higher cycle life than was previously available by their use of relatively thin electrode structures. The THINFILM™ lead-acid battery for high power applications is a good example of thin electrode structures and good materials utilization, but the electrode is still not thin enough to achieve a cycle life of several thousand. Hence, a major drawback of these batteries is that the liquid electrolytes necessarily limit their cycle life.

Lithium primary battery electrodes are traditionally made by calendering the cathode paste onto a nickel or stainless steel gauze substrate material and compacting between heated rollers. In the case of lithium metal anodes the gauze is used as a substrate material. The substrate material is usually about 2 to 3 mils thick while the anode and cathode are typically about 5 to 10 mils thick The anode and cathode are sandwiched with a microporous polypropylene separator between them and wound in a jelly-roll manner. Usually, the laminates are very thick and the electrode length is about two feet in a typical AA size cell. Rechargeable lithium metal anode batteries, which were available a few years ago, were also constructed in this manner.

These techniques have changed considerably with the advent of lithium ion battery construction. In lithium ion batteries the carbon anode is pasted in relatively thin film form onto a copper foil electrode and the lithiated metal oxide cathode is pasted onto an aluminum foil. The substrate thickness for both anode and cathode is in a range from about 25 to 35 microns, and the active electrode is about 25 microns thick. Additionally, the length of each electrode in a typical AA size cell is about twice that of lithium anode cells. Present day electrode/electrolyte component thickness in gelled electrolyte lithium ion cells is of the order of 50 to 75 microns each. This remains far too thick for optimum electrode utilization and high rate capability. Metallic current collectors are also used, not only adding weight but unwanted thickness to the battery. The thick electrode concept in commercial cells is designed for maximum capacity, while the thick gelled PVDF electrolyte provides ease of handling. However, the internal resistance of this battery is still relatively higher than its liquid electrolyte counterpart, thus decreasing battery performance. Cells constructed from such a design cannot be used at high discharge and charge rates. Thick inactive substrates used in such cell construction effectively reduce the energy density of the battery. In addition, this design exposes the cells to risk of high polarization during charge and discharge, which could lead to breakdown of the liquid solvent electrolyte and consequently loss of capacity, loss of cycle life and inadequate safety.

On the other hand, an existing lead acid battery designed for an electric car can only provide about 60 to 80 miles range before recharge is not suitable either. Known lithium ion batteries are neither cost-effective nor safe for electric vehicles. Furthermore, consumers are generally unwilling to pay a premium price for an electric vehicle while gasoline vehicles remain far less expensive to operate. However, if the price of the battery can be reduced, and the mileage range of the electric vehicle can be increased to a value closer to the mileage range of a conventional vehicle, the electric vehicle will become quite feasible for widespread use.

Another problem with existing rechargeable batteries, even those used in small electronic devices, is that they contain liquid organic solvents that have been found to be relatively unsafe for consumer use. Also, there have been many reports of safety problems with lithium ion batteries, in particular, containing organic solvents as the electrolyte in portable electronics devices. The lithium ion batteries must have special charging circuitry since the battery cannot tolerate any amount of overcharge. Also, they have no built-in chemical mechanism, such as that in nickel-cadmium batteries, that provides for recombination reactions to take over when cells reach full charge, so that the electrolyte never decomposes. In liquid organic electrolyte cells, there is no recombination mechanism and the cell electrolyte quickly start to decompose with overvoltage, leading to production of unwanted gaseous species.

Much of the literature in this field reports that polymer electrolyte batteries can be made in very thin film form and can be flexible. However, batteries containing the polymer electrolytes with liquid organic solvents actually tend to lose performance over time, primarily because of cell orientation related problems. A battery standing upright will tend to have the liquid solvents travel to the bottom of the cell, and during charge and discharge, the current along the cell height will be different because of the difference in the conductivity at the bottom of the electrode and at the top. Such cells do not have very high cycle life and lose capacity as a result of poor charging and discharging.

Glassy electrolytes based on the ternary system, LiI—$Li_2S$—$P_2S_5$ and LiI—$Li_2S$—$B_2S_3$ exhibit lithium ion conductivities of about $1\times10^{-3}$ S/cm and $2\times10^{-3}$ S/cm at room temperature, respectively, for bulk electrolytes. Since the electrolyte is very hard and brittle, it is usually used in a vapor deposited form in very thin films so as to achieve a continuous uniform thickness. Lithium anode batteries based on thin film glassy electrolytes with electrolyte thickness of one to several microns have demonstrated current densities of several tens to hundreds of microamperes per square centimeter at room temperature. Unfortunately, the fabrication of these batteries requires extremely sophisticated deposition equipment and production feasibility and performance of large cells have not yet been demonstrated.

All of the prior art techniques that have been employed to improve the ionic conductivity, mechanical strength, safety, and chemical stability, and to reduce cost by simplifying or improving the synthesis of polymer electrolytes have one or more serious shortcomings. As a result, there is still no room temperature conducting polymer electrolyte available today that is entirely suitable for use with a lithium metal anode in a rechargeable lithium battery, for example. There remains a need for electrochemical cells with polymer electrolytes that have good ionic conductivity at room temperature and below, so that the performance of an electrochemical cell at room temperature or below can be improved. There is also a great need for thinner component batteries that avoid the use of organic solvents in the electrolyte without sacrificing energy density.

BRIEF SUMMARY OF THE INVENTION

The electrochemical cells and batteries of the present invention overcome many of the kinetic constraints on the specific power, cycling efficiency and capacity utilization that are typical of electrochemical devices employing conventional polymer electrolytes and electrodes. A kinetic constraint is, for example, the inability to discharge at high rates leading to polarization losses. The lithium solid polymer electrolytes employed in the cells and batteries of certain preferred embodiments of the present invention are suitable for use at room temperature, and even below, due to their high ionic conductivity compared to previous lithium polymer electrolytes. Not only are these new electrolytes highly conductive, they are also strong enough to be manufactured by high speed roll-to-roll techniques. One advantage of the preferred anodes, cathodes, electrodes and half-electrodes, bipolar units, electrochemical cells and batteries of the present invention is that they employ a thermodynamically stable dry polymer electrolyte that can be manufactured using high speed extrusion or deposition techniques.

While the secondary behavior of existing lithium batteries has been limited by a number of factors related to the materials and design of the system, the preferred ultra-thin battery embodiments of the present invention overcome those drawbacks by incorporating very thin electrode and electrolyte structures, based on ultra thin film active and inactive components in long lengths. This effectively increases the surface area of the active plates. As a consequence, these new batteries have a higher current drain capability lower resistance, higher energy content, lower self-discharge rate, and a wider operating temperature range than presently available solid state batteries. Among many features and advantages, the new rechargeable batteries also provide freedom from dendrite formation, higher efficiency, lower internal resistance, greater capacity utilization, higher cycle life or cyclability, and better reliability and safety than previously available in a rechargeable metal ion battery. Moreover, these batteries are better able to tolerate overcharge and will not lead to the emission of deleterious species or outgassing. In addition, the wholly solid-state lithium-based systems of preferred embodiments of the present invention use less lithium in the cell than is typically used in existing lithium cells, thereby reducing cost as well as increasing the energy content.

In accordance with a preferred embodiment of the present invention, an all-solid-state laminar electrochemical cell for a battery is provided. The cell comprises an anode layer about $0.1-100\mu$ thick, a cathode layer about $0.1-100\mu$ thick, an anode current collector about $0.5-50\mu$ thick attached to said anode, a cathode current collector about $0.5-50\mu$ attached to the cathode, and a layer of solid polymer electrolyte disposed between the anode and cathode layers.

In an alternative embodiment, a all-solid-state laminar electrochemical cell includes an anode layer, a cathode layer, an anode current collector attached to said anode, a cathode current collector attached to the cathode, and a layer of solid polymer electrolyte disposed between the anode and cathode layers. The solid polymer electrolyte is a cationic conductor and has a conductivity of at least $10^{-4}$ S/cm at $25°$ C. and comprises a mixture of a base polymer material comprising at least one ionically conductive polymer and having an initial conductivity of at least about $1\times10^{-5}$ S/cm at $25°$ C. when combined with a metal salt. The electrolyte mixture also includes a metal salt, an inorganic filler having an average particle size <0.05 micron in diameter and a surface area of at least about 100 $m^2/g$, and an ionic conducting material having an average particle size <0.1 micron in diameter and an initial ionic conductivity of at least $2\times10^{-3}$ S/cm at $25°$ C. In certain very thin embodiments of the electrochemical cell the anode layer is about $0.1-100\mu$ thick, the cathode layer is about $0.1-100\mu$ thick, the anode and cathode current collectors are each $0.5-50\mu$ thick, and the solid polymer electrolyte is about $0.5-100\mu$ thick. Preferably the anode is lithium, and the metal salt is a lithium salt, such as lithium hexafluorophosphate ($LiPF_6$), lithium perchlorate ($LiClO_4$), lithium tetrafluoroborate ($LiBF_4$), lithium hexafluoroarsenate ($LiAsF_6$), lithium tetrachloroaluminate ($LiAlCl_4$), lithium trifluoromethanesulfonate ($LiCF_3SO_3$), lithium methide ($LiC(SO_2CF_3)_3$ and lithium bis(trifluoromethane sulfonyl) imide ($LiN(CF_3SO_2)_2$). It is preferred that the ionic conducting material of the solid polymer electrolyte is a lithium ion conducting material such as a glassy lithium ion conductor or a ceramic lithium ion conductor. It is also preferred that the inorganic filled is fumed silica and alumina.

In some embodiments of the electrochemical cells the base polymer material comprises at least two polymers, and in some of those embodiments the base polymer material comprises about 1% to 99% (by weight of said base polymer material) of one polymer and the remainder is at least one other polymer. In the preferred embodiments the first polymer is an ionically conductive polymer, the monomers of which have a hetero atom with a lone pair of electrons available for the metal ions of a metal salt to attach to and move between during conduction, when the first polymer is mixed with a metal salt. The first polymer may be a linear polymer, random copolymer, block copolymer, comb-branched block copolymer, network structure, single ion conductor, polyvinylidene fluoride or chloride (or a copolymer of their derivatives), poly(chlorotrifluoroethylene), poly(ethylene-chlorotrifluoro-ethylene) or poly(fluorinated ethylene-propylene). In some embodiments, the first polymer is combinable with a lithium salt such that the ionic conductivity of the polymer is enhanced, and the polymer is chosen from the group consisting of polyethylene oxide (PEO), oxymethylene linked PEO, PEO-PPO-PEO crosslinked with trifunctional urethane; poly(bis(methoxy-ethoxy-ethoxide))-phosphazene (MEEP); a triol-type PEO crosslinked with difunctional urethane, poly((oligo)oxyethylene)methacrylate-co-alkali metal methacrylate; polyacrylonitrile (PAN), polymethylmethacrylate (PMMA), polymethylacrylonitrile (PMAN); polysiloxanes and their copolymers and derivatives, polyvinylidene fluoride or chloride and copolymers of their derivatives, poly(chlorotrifluoro-ethylene), poly(ethylene-chlorotrifluoroethylene), poly(fluorinated ethylene-propylene), acrylate-based polymer, other similar solvent-free polymers, combinations of the foregoing polymers either condensed or crosslinked to form a different polymer, and physical mixtures of any of these polymers.

In some embodiments of the all-solid-state laminar electrochemical cell a second polymer of the at least two polymers making up the base polymer material is more inert with respect to ionic conductivity and is stronger than the first polymer. The conductivity is measured when each of the polymers is in the form of a thin film. The second polymer may be chosen from the group consisting of polyester (PET), polypropylene (PP), polyethylene napthalate (PEN), polyvinylidene fluoride (PVDF), polycarbonate (PC), polyphenylene sulfide (PPS), polytetrafluoroethylene (PTFE), and other polymer materials that possess stability and strength characteristics similar to one of said group of polymers.

Some embodiments of the all-solid-state laminar electrochemical cells have a stacked configuration, or the layers may be wound or rolled together. Some of the more preferred electrochemical cells have conformable structures, due to their flexibility and thinness.

In some embodiments the current collectors used in the electrochemical cell are very thin structures that are either a metallic element less than $10\mu$ thick or a metallized plastic 0.5 to $50\mu$ thick.

Also provided in accordance with the present invention are elemental anodes for a polymer electrolyte battery. In some embodiments the anode comprises a $0.1-100\mu$ thick layer of elemental anode material overlying a current collector that is either a metallic current collector about $0.5-50\mu$ thick, or a metallized polymer current collector comprising a polymer substrate about $0.5-50\mu$ thick and a metallization layer up to about $1\mu$ thick overlying the polymer substrate. The metallic current collector and the metallization layer are preferably aluminum, nickel, carbon, inconel, copper, stainless steel, zinc and gold or other suitably compatible materials with the active electrode.

In some embodiments the metallic current collector is about $2-5\mu$ in thickness, and in some embodiments it is less than $2\mu$ thick. In the embodiments employing a metallized polymer current collector, it may comprise a polymer substrate about $0.5-50\mu$ thick and a metallization layer up to $1\mu$ thick on top of the polymer substrate. Certain preferred embodiments leave a non-metallized margin on the polymer substrate. In preferred embodiments of the elemental anode, the anode material is chosen from the group consisting of lithium, sodium, potassium, magnesium, calcium, zinc, nickel, ion-insertion polymers, ion-insertion inorganic electrodes, carbon and tin oxide.

Also in accordance with the present invention anode half-elements for polymer electrolyte batteries are provided. In some embodiments the anode half-element includes one of the above-described elemental anodes together with a layer of solid polymer electrolyte overlying the elemental anode material. The solid polymer electrolyte is a cationic conductor having a conductivity greater than $1\times10^{-4}$ S/cm at 25° C. or below. The solid polymer electrolyte comprises a mixture of base polymer material, a metal salt, inorganic filler and ionic conducting material as described above.

In some embodiments the anode half-element is for a lithium polymer electrolyte battery and comprises a substrate about $0.5-50\mu$ thick containing a current collector. A thin layer of lithium anode material about $0.1-100\mu$ thick lies on top of the current collector. The lithium anode material may comprise a mixture of an active anode substance and a base polymer material comprising at least one ionically conductive polymer and having an initial conductivity of at least about $1\times10^{-5}$ S/cm at 25° C. when combined with a lithium salt. The mixture also include the lithium salt, an inorganic filler having an average particle size <0.05 micron in diameter and a surface area of at least about 100 $m^2/g$, and a lithium ion conducting material having an average particle size <0.1 micron in diameter and an initial ionic conductivity of at least $2\times10^{-3}$ S/cm at 25° C. In some of these embodiments the active anode substance is chosen from the group consisting of ion-insertion polymers, ion-insertion inorganic electrodes, carbon insertion electrodes and tin oxide.

Further provided by the present invention are cathode half elements for solid polymer electrolyte batteries. In some embodiments the cathode half element comprises a $0.1-100\mu$ thick layer of cathode material overlying a current collector chosen from the group consisting of metallic current collectors about $0.5-50\mu$ thick, and metallized polymer current collectors about $0.5-50\mu$ thick comprising a polymer substrate and a metallization layer up to about $1\mu$ thick.

In some of these embodiments the cathode material comprises a mixture of an active cathode substance, such as an oxide, sulfide or selenide, and a solid polymer electrolyte composition as described above. The active cathode substance may be one chosen from the group consisting of $MnO_2$, $LiMn_2O_4$, $Li_xMnO_2$, $MoS_2$, $MoS_3$, $MoV_2O_8$, $CoO_2$, $Li_xCoO_2$, $V_6O_{13}$, $V_2O_5$, $V_3O_8$, $VO_2$, $V_2S_5$, $TiS_2$, $NbSe_3$, $Cr_2O_5$, $Cr_3O_8$, $WO_3$, $Li_xNiO_2$, $Li_xNi_yCo_zO_2$, $Li_xMn_zO_2$ and $Li_xCo_yMn_zO_2$.

In some alternative embodiments the cathode half element may employ as the active cathode substance a lithium doped electronically conducting polymer. The electronically conducting polymer may be polypyrrole, polyaniline or polyacetylene, for example.

Further provided by the present invention are thin electrodes for an all-solid-state lithium polymer electrolyte battery comprising a substrate about $0.5-50\mu$ thick, current collector, and a layer of active electrode/polymer electrolyte composite about $0.1-100\mu$ thick overlying a side of the substrate. The active electrode/polymer electrolyte composite comprises a mixture of an active electrode material, a base polymer material comprising at least one ionically conductive polymer and having an initial conductivity of at least about $1\times10^{-5}$ S/cm at 25° C. when combined with a lithium salt, a lithium salt, an inorganic filler having an average particle size <0.05 micron in diameter and a surface area of at least about 100 m$^2$/g, and an ionic conducting material having an average particle size <0.1 micron in diameter and an initial ionic conductivity of at least 2×10$^{-3}$ S/cm at 25° C. In some embodiments the substrate is an ultra-thin film metallized polymer substrate comprising a polymer layer about 0.5–50 microns thick and a metallization layer up to 1$\mu$ thick and having a conductivity of about 0.01–1.0 ohm per square. The metallization layer covers one side of the polymer layer and serves as the current collector. The metallization layer is 0.0$\mu$ thick or less in some of the preferred embodiments.

Also in accordance with the present invention are provided bipolar electrodes for a battery. Certain embodiments of the bipolar electrodes comprise a flexible polymer substrate about 0.5–50$\mu$ thick and having two opposite sides and two opposite edges. In some embodiments of the bipolar electrode the flexible polymer substrate is impregnated with an electronically conductive element that is chemically inert to said anode and cathode layers. Two metallization layers 0.01–1$\mu$ thick overlie each entire sides of the polymer substrate with no margins. A 0.1–100$\mu$ thick anode layer overlies one of the metallization layers and a 0.1–100$\mu$ thick cathode layer overlies the other metallization layer. The ration of the substrate thickness to anode or cathode layer thickness is less than about 0.5, and the surface resistivity of the anode and cathode layers is each less than 0.1 ohms per square. Some embodiments of the bipolar electrode include a layer of solid polymer electrolyte overlying the anode and/or the cathode. The solid polymer electrolyte comprises a mixture of base polymer material, metal sat, inorganic filler and ionic conducting material as previously described.

A preferred embodiment of a bipolar electrode for a battery comprises a flexible polymer substrate about 0.5–50$\mu$ thick impregnated with an electronically conductive element. Two metallization layers up to 1$\mu$ thick overlie respective opposite sides of the polymer substrate. A 0.1–100$\mu$ thick anode layer overlies one metallization layer and a 0.1–100$\mu$ thick cathode layer overlies the other metallization layer. The electronically conductive element is chemically inert to the anode and cathode and preferably has a conductivity greater than 10$^2$ S/cm at 25° C. In certain embodiments the electronically conductive element is chosen from the group consisting of conductive carbon, electronically conducting polymer, e.g. polyacetylene, polypyrrole, polyaniline, etc., and finely divided metal.

Still further provided by the present invention are batteries employing the above described electrodes, half-elements and electrochemical cells. One such embodiment is a defined capacity battery in which the anode layer comprises a predetermined deposited amount lithium, sodium, potassium, magnesium, calcium, zinc or nickel per unit area of said anode layer.

Certain embodiments of the invention provide leakproof batteries comprising an all-solid-state laminar electrochemical cell as described above together with a hermetically sealed covering.

Certain embodiments provide overcharge tolerant batteries comprising an all-solid-state laminar electrochemical cell as described above. An overcharge tolerant battery may also include an overcharge indicator.

Orientation tolerant polymer electrolyte batteries having an all-solid-state composition employing the above described laminar electrochemical cells are also provided by the present invention and operate optimally in any configuration or independent of vertical or horizontal positioning. In certain preferred embodiments the battery employs a wound electrochemical cell in a cylindrical configuration. Metallic terminations may be applied to the cylinder ends. The terminations may comprise one or more end coatings. Some embodiments also include a hermetic or moisture-resistant covering, such as an epoxy coating, to protect the cell from the environment. Instead of containing a wound electrochemical cell, some embodiments of the all-solid-state batteries contain a laminar cell in a zig-zag or concertina configuration.

A preferred embodiment of a battery is an all-solid-state lithium polymer electrolyte battery comprising a pair of spaced-apart flexible thin film electrodes, each of the electrodes comprising a layer of active electrode material overlying a polymer substrate having an adherent electrically conductive layer disposed thereon and/or having an electrically conductive material dispersed in the polymer substrate. The battery also includes a resilient and flexible thin film solid polymer electrolyte tightly disposed between the pair of electrodes, said electrolyte having a conductivity of at least about 1×10$^{-4}$ S/cm at 25° C. and containing a mixture of at least two polymers, one of which is an ionically conductive polymer having an initial conductivity of at least about 1×10$^{-5}$ S/cm at 25° C. when combined with a lithium salt. The mixture also contains the lithium salt, an inorganic filler having an average particle size <0.05 micron in diameter and a surface area of at least about 100 m$^2$/g, and a lithium ion conducting material having an average article size <0.1 micron in diameter and an initial ionic conductivity of at least 2×10$^{-3}$ S/cm at 25° C. In certain embodiments the inactive polymer substrate of each electrode is PET, PP, PPS, PEN, PVDF or PE. In certain embodiments the inactive polymer substrate is a metallized polymer substrate having a thin metallization layer which serves as the adherent electrically conductive layer. In some preferred embodiments the metallized polymer substrate is about 0.5 to 50 microns thick and the thin metallization layer has a resistivity of about 0.01 to 1 ohm per square. The metallized polymer substrate may further include a first side containing a first non-metallized margin. The battery of claim 56 wherein said non-metallized margin extends about 1 to 3 mm from an edge of said first side to an edge of said first metallization layer. Some embodiments also comprise a second metallization layer adhered to a second side of the polymer layer. In these embodiments the second side of the polymer layer comprises a second unmetallized margin directly opposite the first unmetallized margin and extending about 1 to 3 mm from the substrate edge to an edge of the second metallization layer.

Also in accordance with the present invention are provided improved lithium polymer electrolyte batteries. One embodiment of an improved battery having a lithium metal anode layer, a cathode layer, an anode current collector attached to said anode layer, a cathode current collector attached to said cathode layer, and a layer of lithium polymer electrolyte disposed between said anode and cathode layers, includes the improvement comprising substitution of a lithium solid polymer electrolyte having a conductivity of at least about 10$^{-3}$ to 10$^{-4}$ S/cm at 25° C. for the polymer electrolyte. The lithium solid polymer electrolyte comprises a mixture of a polymer or polymer blend having an initial conductivity of at least about 1×10$^{-5}$ S/cm at 25° C. when combined with a lithium salt. The mixture also includes the lithium salt, an inorganic filler having an average particle size <0.05 micron in diameter and a surface area of at least about 100 m$^2$/g, and a lithium ion conducting material having an average particle size <0.1 micron in diameter and an initial ionic conductivity of at least 2×10$^{-3}$ S/cm at 25°

C. The improved battery has a cell resistance less than or equal to that of a liquid electrolyte lithium battery.

Certain of the improved lithium polymer batteries substitute an ultra-thin current collector that is either a metallic element less than $10\mu$ thick or a metallized plastic 0.5 to $50\mu$ thick, in place of a conventional current collector.

In some embodiments of an improved lithium polymer battery, the improvement also includes substituting for the anode and/or cathode layers a flexible ultra thin film electrode containing a metallized polymer substrate having an inactive polymer layer about 0.5–50 microns thick, a metallization layer up to about 0.01 micron thick overlying the inactive polymer layer. The improvement also includes a layer of active electrode material up to about 5 microns thick overlying the metallization layer, and substituting for the polymeric electrolyte a lithium solid polymer electrolyte in the form of a thin film up to about 5 microns thick. The lithium solid polymer electrolyte comprises a mixture of a polymer or polymer blend having an initial conductivity of at least about $1\times10^{-5}$ S/cm at 25° C. when combined with a lithium salt, the lithium salt, an inorganic filler having an average particle size <0.05 micron in diameter and a surface area of at least about 100 m²/g, and a lithium ion conducting material having an average particle size <0.1 micron in diameter and an initial ionic conductivity of at least $2\times10^{-3}$ S/cm at 25° C.

In some embodiments of the improved batteries, the inorganic filler is 0.1–20% (by volume of solid polymer electrolyte) high surface area filler having an average particle size $\leq 0.01$ micron and chosen from the group consisting of fumed silica and alumina.

In some embodiments of the improved batteries the lithium ion conductor material is 0.1–80% sulfide glass (by volume of solid polymer electrolyte).

In some embodiments of the improved batteries the lithium ion conductor material is a ceramic ion conductor chosen from the group consisting of lithium beta alumina and silicates.

In certain embodiments of an improved lithium polymer electrolyte battery the cathode layer comprises a solid polymeric composite containing a mixture of active cathode material having an average particle size $\leq 0.1$ micron and a base polymer material comprising at least one ionically conductive polymer and having an initial conductivity of at least about $1\times10^{-5}$ S/cm at 25° C. when combined with a metal salt. The mixture also includes a metal salt, an inorganic filler having an average particle size <0.05 micron in diameter and a surface area of at least about 100 m²/g, and an ionic conducting material having an average particle size <0.1 micron in diameter and an initial ionic conductivity of at least $2\times10^{-3}$ S/cm at 25° C. In some embodiments the composite cathode may also contain an appropriate binder material.

A preferred embodiment of a battery of the invention is a rechargeable all-solid-state lithium polymer electrolyte battery comprising an ultra thin lithium anode, which may be either a metallic lithium element or a lithium metal layer about 0.1 to 100 microns thick, over the metallization layer of a metallized polymer substrate. The metallized polymer substrate has an inactive polymer layer about 0.5 to 50 microns thick and a metallization layer 0.01–$1\mu$ thick on top of the inactive polymer layer. This battery also has an ultra thin-film cathode layer containing a metallized polymer substrate. The metallized polymer substrate has an inactive polymer layer about 0.5 to 50 microns thick and a metallization layer about 0.01–$1\mu$ thick on top of the inactive polymer layer, and has a layer of active cathode material 0.1–$100\mu$ thick on top of the metallization layer. The battery also has a polymer electrolyte layer up to 0.2–$100\mu$ thick placed between the above-described anode and cathode layers. This polymer electrolyte has a conductivity greater than $1\times10^{-4}$ S/cm at 25° C., or may even conduct as well below 25° C. The polymer electrolyte comprises a mixture of a base polymer material comprising at least one ionically conductive polymer and having an initial conductivity of at least about $1\times10^{-5}$ S/cm at 25° C. when combined with a lithium salt. The mixture also includes the lithium salt, an inorganic filler having an average particle size <0.05 micron in diameter and a surface area of at least about 100 m²/g, and a lithium ion conducting material having an average particle size <0.1 micron in diameter and an initial ionic conductivity of at least $2\times10^{-3}$ S/cm at 25° C.

In certain preferred embodiments of a rechargeable all-solid-state lithium polymer electrolyte battery, as described above, the polymer electrolyte comprises a mixture of about 30 to 95% (by weight of solid polymer electrolyte) base polymer material containing at least one ionically conductive polymer and having an initial conductivity of at least about $1\times10^{-5}$ S/cm at 25° C. when combined with a lithium salt. The mixture also includes about 1 to 25% (by weight of solid polymer electrolyte) said lithium salt, about 0.1–60% (by volume of solid polymer electrolyte) inorganic filler having an average particle size <0.05 micron in diameter and a surface area of at least about 100 m²/g, and about 0.1–80% (by volume of solid polymer electrolyte) ionic conducting material having an average particle size <0.1 micron in diameter and an initial ionic conductivity of at least $2\times10^{-3}$ S/cm at 25° C. In certain preferred embodiments the concentration of inorganic filler is about 0.1–20% (by volume of solid polymer electrolyte) and the concentration of ionic conducting material is about 0.1–20% (by volume of solid polymer electrolyte).

Also in accordance with the present invention are provided methods of making ultra-thin solid polymer electrochemical cells, and thin components thereof. In one embodiment, an ultra-thin solid polymer electrochemical cell is fabricated by a) preparing an anode sheet by applying active anode material to an inactive anode substrate such that the ratio of anode substrate thickness to anode sheet thickness is $\leq 0.8$ and the conductivity is $\leq 1$ ohms per square; b) preparing a cathode sheet by applying active cathode material to an inactive cathode substrate such that the ratio of cathode substrate thickness to cathode sheet thickness is $\leq 0.8$ and the conductivity is $\leq 1$ ohms per square; c) preparing a solid polymer electrolyte having a conductivity of at least $10^{-4}$ S/cm at 25° C. and comprising a mixture of a polymer or polymer blend having an initial conductivity of at least about $1\times10^{-5}$ S/cm at 25° C. when combined with a lithium salt, the lithium salt, an inorganic filler having an average particle size <0.05 micron in diameter and a surface area of at least about 100 m²/g, and a lithium ion conducting material having an average particle size <0.1 micron in diameter and an initial ionic conductivity of at least $2\times10^{-3}$ S/cm at 25° C., an organic solvent, and a curing agent; d) coating the cathode sheet with the solid polymer electrolyte, e) evaporating the solvent, and f) curing the polymer electrolyte to yield an electrolyte-coated cathode sheet; g) laminating the electrolyte-coated cathode sheet and the anode sheet together such that the electrolyte coat is between the cathode active material and the anode active material, whereby a cathode/electrolyte/anode laminate is formed; h) optionally winding the laminate; and i) optionally shaping the laminate.

In some embodiments the step of preparing an anode sheet comprises applying active anode material-to an inactive anode substrate containing an inactive polymer substrate and a thin metallization layer overlying at least a portion of the polymer substrate. The application is done is such a manner that the ratio of anode substrate thickness to anode sheet thickness is ≦0.8 and the conductivity is ≦1 ohms per square. The step of preparing a cathode sheet comprises applying active cathode material to an inactive cathode substrate containing an inactive polymer substrate and a thin metallization layer overlying at least a portion of the polymer substrate, such that the ratio of cathode substrate thickness to cathode sheet thickness is also ≦0.8 and the conductivity is ≦1 ohms per square.

Methods of making a strong and flexible anode/electrolyte half-element for a laminar battery are provided according to certain embodiments of the present invention. In some of these embodiments the method includes depositing a 0.1–100 microns thick layer of elemental metal onto an electrically conductive substrate that is either a metallic current collector about 1–10$\mu$ thick or a metallized polymer current collector comprising a polymer substrate about 0.5–50$\mu$ thick and a metallization layer up to about 1$\mu$ thick on top of the polymer substrate. The elemental metal is preferably lithium, sodium, potassium, magnesium, calcium, zinc or nickel. The metallization layer preferably has a resistivity less than 1 ohms per square. The metallization-material is chosen from the group consisting of Al, Cu, Ni, Zn, C, stainless steel, iconel, or any other suitably compatible material with the active electrode. The process also includes applying a layer of solid polymer electrolyte onto the layer of elemental metal, the solid polymer electrolyte having a conductivity greater than $1 \times 10^{-4}$ S/cm at 25° C. or below. The electrolyte comprises a mixture of base polymer material, metal salt, inorganic filler and ionic conducting material, as previously described. In certain embodiments elemental metal depositing comprises evaporating or sputtering the metal directly onto the current collector in a continuous step, and in some embodiments a predetermined quantity of elemental metal is applied to yield a precise elemental metal capacity per unit area of anode when the anode half-element is employed in a defined-capacity battery. The method may also include tabbing the elemental metal layer by metal punching through the polymer substrate.

Methods of making a strong and flexible electrode/electrolyte half-element for a laminar battery are also provided according to certain embodiments of the present invention. In some of these embodiments the method comprises depositing a 0.1–100 microns thick layer of active anode or cathode material onto an electrically conductive substrate containing either a metallic current collector about 1–10$\mu$ thick or a metallized polymer current collector comprising a polymer substrate about 0.5–50$\mu$ thick and a metallization layer up to about 1$\mu$ thick overlying the polymer substrate. The metallization layer has a resistivity less than 1 ohm per square. The method also includes applying a layer of solid polymer electrolyte onto the layer of cathode material. The solid polymer electrolyte can be the same as described above. In certain embodiments of this method depositing of the active electrode material includes casting the active electrode material using a knife coater, doctor blade coater, wire-wound bar coater, air knife coater, squeeze roll, gravure coater, reverse roll coater, cast film coater or a transfer roll coater. The solid polymer electrolyte may also be applied over the electrode material by one of the same casting techniques. In other embodiments the depositing of active electrode material and application of solid polymer electrolyte may be accomplished by extrusion.

Still further, methods of making a thin bipolar battery are provided according to certain embodiments of the present invention. In some of these embodiments the method comprises laminating tightly together at least one layer of bipolar unit between a layer of first anode and a layer of first cathode to provide a stack having laminar ends. A preferred bipolar unit includes a flexible first polymer substrate about 1–10$\mu$ thick that has two opposite sides, for example, like the top and bottom of a flat, rectangular or elongated sheet. The substrate also has two opposite edges, for example, like the longitudinal edges of an elongated flat sheet. The first polymer substrate optionally includes an electrically conductive material dispersed in the polymer substrate. Two metallization layers up to 1$\mu$ thick coat each said side. The bipolar unit also includes a 0.1–100$\mu$ thick second anode layer overlying one metallization layer, and a 0.1–100$\mu$ thick second cathode layer overlying the other said metallization layer. In preferred embodiments, the ratio of substrate thickness to second anode or second cathode layer thickness is less than about 0.5, and the surface resistivity of the second anode and second cathode layer is less than 1 ohms per square. This bipolar unit also includes a layer of solid polymer electrolyte overlying at least one of the second anode and the second cathode. The solid polymer electrolyte having a conductivity of at least $10^{-4}$ S/cm at 25° C. and comprising an above-described mixture. The first anode comprises a 0.1–100$\mu$ thick layer of elemental anode material overlying a current collector that is either a metallic current collector about 1–10$\mu$ thick or a metallized polymer current collector comprising a second polymer substrate about 0.5–50$\mu$ thick and a metallization layer up to about 1$\mu$ thick overlying the second substrate. This embodiment of a bipolar unit also includes a layer of the solid polymer electrolyte overlying the layer of elemental anode material. The first cathode comprises a 0.1–100$\mu$ thick layer of cathode material overlying a current collector that is either a metallic current collector about 1–10$\mu$ thick or a metallized polymer current collector about 0.5–50$\mu$ thick comprising a polymer substrate and a metallization layer up to about 1$\mu$ thick. In making up the bipolar battery, the first anode and first cathode are oriented such that the first anode elemental material opposes the active cathode substance of the second cathode of a bipolar unit, with a layer of solid polymer electrolyte disposed between the first anode and second cathode. The process of making the battery also includes applying current collectors to the laminar ends.

In yet another embodiment of the present invention, methods of manufacturing ultra-thin laminar batteries are provided. According to some of these embodiments the method comprises a) winding a 0.1–100$\mu$ thick cathode sheet into a roll, the cathode sheet comprising a flexible inactive polymer substrate and a layer of active cathode material overlying the substrate; b) extruding a uniform 1–10$\mu$ thick layer of a lithium solid polymer electrolyte composition onto the cathode sheet while the roll is drawn at a uniform rate by an uptake reel, to obtain a roll of flexible substrate/active cathode/electrolyte composite, said lithium solid polymer electrolyte comprising a mixture of a base polymer material comprising at least one ionically conductive polymer and having an initial conductivity of at least about $1 \times 10^{-5}$ S/cm at 25° C. when combined with a lithium salt. The mixture also includes the lithium salt, inorganic filler and a lithium ion conducting material, as previously described; c) curing the extruded polymer electrolyte composition as the composite is continuously wound by said uptake reel, to yield a roll of cathode/electrolyte laminate; d) winding a lithium anode sheet to provide a roll of anode laminate, said lithium anode sheet comprising a 0.1–100µ thick layer of elemental anode material overlying a current collector that is either a metallic current collectors about 1×10µ thick or a metallized polymer current collector comprising a polymer substrate about 0.5–50µ thick and a metallization layer up to about 1 thick overlying the polymer substrate; e) winding a 0.5–100µ thick sheet of inert plastic to provide a first roll of plastic; f) winding a 0.5–100µ thick sheet of inert plastic to provide a second roll of plastic; g) while simultaneously unrolling said rolls of cathode/ electrolyte laminate, anode laminate and first and second rolls of plastic, laminating said cathode/electrolyte laminate and said anode laminate together, between layers of said plastic sheet, whereby adjacent layers of plastic sheet/ cathode/electrolyte/lithium anode/plastic sheet are in continuous mutual contact and extraneous air is excluded from between the layers, whereby a cylindrical laminated cell having first and second electrode edges is obtained; h) applying a current collector to each said edge; i) attaching leads to the respective current collectors; j) maintaining pressure on said laminated cell; and k) hermetically sealing said cell.

In some embodiments of the foregoing method the extruding step comprises extruding a uniform thin layer of the polymer electrolyte composition onto the cathode sheet in such a manner as to leave an uncovered margin of the substrate along one longitudinal edge of the substrate. The laminated cell may also be heated to improve the interface between the layers. The heating may be performed under reduced atmospheric pressure, or a vacuum, to further improve contact between the layers.

In yet another aspect of the invention, a method of making a thin film electrode/electrolyte half-element for a battery is provided. This method includes laminating together a sheet of thin film composite electrode and a sheet of thin film solid polymer electrolyte, to form a laminate. Optionally, the laminate is heated to improve contact between the layers, with the optional application of a vacuum to the laminate during the heating process. In some embodiments the composite electrode comprises a 0.1–100µ thick polymeric composite layer overlying a 0.5–50µ thick flexible plastic substrate. The polymeric composite layer may comprise a mixture of active electrode material having an average particle size of less than 0.1 micron in diameter, a first base polymer material comprising at least one ionically conductive polymer and having an initial conductivity of at least about $1\times10^{-5}$ S/cm at 25 °C. when combined with a metal salt. The polymeric composite also contains the metal salt, an inorganic filler having an average particle size less than 0.05 micron in diameter and a surface area of at least about 100 m$^2$/g, and an ionic conducting material having an average particle size less than 0.1 micron in diameter and an initial ionic conductivity of at least $1\times10^{-3}$ S/cm at 25° C. In this embodiment, the solid polymer electrolyte has a conductivity greater than $1\times10^{-4}$ S/cm at 25° C. or below and comprises a mixture of a second base polymer material comprising at least one ionically conductive polymer and having an initial conductivity of at least about $1\times10^{-5}$ S/cm at 25° C. when combined with the metal salt. The solid polymer electrolyte mixture also contains the metal salt, an inorganic filler having an average particle size less than 0.05 micron in diameter and a surface area of at least about 100 m$^2$/g, and an ionic conducting material having an average particle size less than 0.1 micron in diameter and an initial ionic conductivity of at least $2\times10^{-3}$ S/cm at 25° C. The first and second base polymer materials may be the same or different polymers or polymer blends. In some embodiments, the polymer electrolyte is already in a cured and extruded form and in a roll, and the electrode/electrolyte are laminated together in a roll-to-roll manner. These and other embodiments, features and advantages of the present invention will become apparent with reference to the following description and drawings.

BRIEF DESCRIPTION OF THE SEVERAL VIEWS OF THE DRAWING

For a detailed description of certain preferred embodiments of the invention, reference will now be made to the accompanying drawings wherein.

DETAILED DESCRIPTION OF THE PREFERRED EMBODIMENTS

Figure 1A:
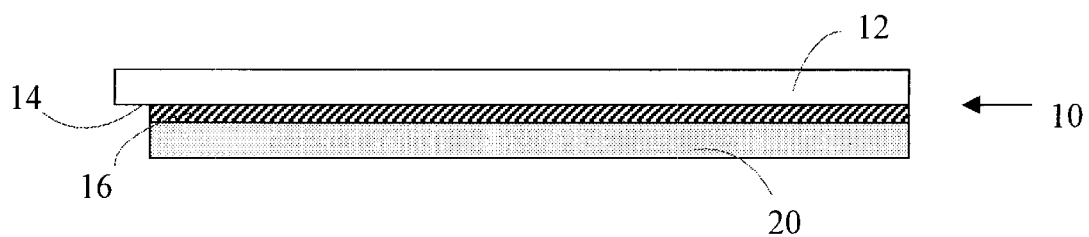
FIG. 1A shows a metallized plain polymer film with an unmetallized margin and a coating of active cathode material not on the margin.

The inventor has developed new power source technologies that can satisfy many of the requirements which are not presently met by state-of-the-art batteries, electrochemical cells, electrodes, bipolar electrodes, and solid state electrolytes. Methods of fabricating solid state electrochemical cells, particularly high energy density cells having very thin electrode and electrolyte structures for building ultra-thin laminar batteries are described in detail below. Also described are methods of making polymer electrolyte batteries containing such electrochemical cells, particularly rechargeable all-solid-state lithium polymer electrolyte batteries.

Thin-Film Solid Polymer Electrolyte

A very thin low resistance, flexible film of polymer electrolyte preferably is prepared as disclosed in related application Ser. No. 09/388,741, or as described and exemplified below:

EXAMPLE 1

A base polymer material and a lithium salt are dissolved in a suitable liquid organic solvent (anhydrous) to form a polymer solution. Preferably the lithium salt is lithium hexafluorophosphate (LiPF$_6$), lithium perchlorate (LiClO$_4$), lithium tetrafluoroborate (LiBF$_4$), lithium hexafluoroarsenate (LiAsF$_6$), lithium tetrachloroaluminate (LiAlCl$_4$), lithium trifluoromethanesulfonate (LiCF$_3$SO$_3$), lithium methide (LiC(SO$_2$CF$_3$)$_3$ or lithium bis(trifluoromethane sulfonyl) imide (LiN(CF$_3$SO$_2$)$_2$). Preferably the base polymer material contains at least two polymers, the first being an ionically conductive polymer, the monomers of which have a hetero atom with a lone pair of electrons available for the metal ions of a metal salt to attach to and move between during conduction, when the polymer is mixed with the lithium salt. The second polymer is more inert with respect to ionic conductivity and is stronger than the first polymer when they are in the form of a thin film. Preferably the second polymer is polyester (PET), polypropylene (PP), polyethylene napthlate (PEN), polyvinylidene fluoride (PVDF), polycarbonate (PC), polyphenylene sulfide (PPS), polytetrafluoroethylene (PTFE), or another polymer that possess stability and strength characteristics similar to one of these polymers. The second polymer serves to provide the basic backbone or strength of the final polymer electrolyte when manufactured in ultra-thin films. However, if the first polymer material provides sufficient strength to the polymer electrolyte, one need not include a second polymer in the composition of the base polymer material. Likewise, if a polymer selected from the second group, in addition to meeting the requisite film strength requirement also provides the desired ionic conductivity to the polymer electrolyte, a different polymer from the first group need not be included in the composition of the base polymer material. The composition of the base polymer material may comprise about 1% to 99% (by weight of said base polymer material) of the first polymer with the remainder being at least one other polymer.

A very high surface area inorganic filler—either fumed silica or alumina having an average particle size <0.05 micron and a surface area of at least about 100 m$^2$/g—is then extensively dispersed with a concentration in a range from about 0.1–60% by volume of the final solid polymer composition to enhance the mechanical stability and ionic conductivity of the thin film into which the polymer material with inorganic filler is cast. Further to this polymer mixture is added a finely dispersed ion conducting material having an average particle size <0.1 micron and initial ionic conductivity of at least $2\times10^{-3}$ S/cm at room temperature. Preferably the ion conducting material is a lithium ion conductor and makes up 0.1–80% by volume of the final composition or composite. The lithium ion conductor is preferably a lithium ion conducting sulfide glass or a ceramic lithium ion conductor such as lithium beta alumina or a silicate, or some other ionically conducting material of high lithium ion mobility. Care is taken to blend these constituents in an inert atmosphere since the sulfide glasses are extremely hygroscopic and may effect the performance of the final lithium batteries. This base polymer material with the plasticizer lithium salt, inorganic filler and glassy or ceramic lithium ion conductor when cast as a sheet film material and the solvent allowed to evaporate constitute the polymer electrolyte for a lithium polymer electrolyte battery. The polymer electrolyte of this composition provides a very high room temperature ionic conductivity with excellent mechanical strength.

Alternately, the base polymer material with the salt, inorganic filler, and glassy or ceramic lithium ion conductor may be intimately mixed with one another and may be cast or extruded using a hot-melt resin process. Dispersion of the inorganic filter and glassy or ceramic ion conductor into the polymer blend is performed during polymer and salt dissolution into the solvent or during extrusion of the polymer. In some embodiments, the filler is preferably 0.1–20% fumed silica or alumina having an average particle size less than or equal to 0.01 micron and the glassy or ceramic lithium ion conductor is also preferably 0.1–20% by volume having an average particle size less than or equal to 0.01 micron.

EXAMPLE 2

2 g of LiClO$_4$ salt was mixed with 4 g of PEO (MW $3\times10^5$) and 4 g of PEG (MW $5\times10^6$) in a less than 1% relative humidity dry room. The polymer/salt mixture was cast on an aluminum plate. The material was a solid gel and its ionic conductivity measured $5\times10^{-5}$ S/cm. The ionic conductivity of another similarly-prepared polymer/salt mixture measured $7\times10^{-5}$ S/cm. Knowing the base ionic conductivity of the initial polymer/salt mixture, 2 g of high surface area alumina and 5 g of finely powdered LiI—Li$_2$S—B$_2$S$_3$ glass was added to the polymer/salt solution, and the final mixture was cast on an aluminum plate. The conductivity of the final material measured $4\times10^{-4}$ S/cm.

EXAMPLE 3

2 g of lithium imide salt was mixed with a range of acrylate monomers and oligomers, including 2.1 g of isobornyl acrylate, 0.3 g of 1,6-hexanediol diacrylate, 0.8 g trimethylolpropane triacrylate, 8 g ebecryl 230 and 4 g PEO, and 0.014 g of ITX and 0.14 g of Irgacure 184 photoinitiator, dispersed in 20 volume percent isopropanol. A sample portion of this mixture was cast in a thin sheet, the IPA evaporated completely and cured using a 1000 Watts UV light. The conductivity of the cast film was measured to be $4\times10^{-5}$ S/cm. The cast intermediate was very flexible and plastic-like. Next, 2.6 g of very high surface alumina and 8 g of finely dispersed LiI—$_2$S—B$_2$S$_3$ glass was added to the polymer/salt solution and the mixture was then cast on an aluminum plate. The solvent was completely evaporated and the polymer mixture cured using UV light. The conductivity of the final polymer electrolyte measured $6.5\times10^{-4}$ S/cm.

EXAMPLE 4

15 mls of trimethylolpropane trimethylacrylate, 5 mls tripropylene glycol diacrylate, and 15 mls of ebecryl 230 was mixed with 3 g of lithium imide, 0.5 g Irgacure 184, 3 g of fumed silica and 5 g of the above sulfide glass. The mixture was cast between glass plates to obtain a very thin sheet and cured using UV light. The conductivity of the thin polymer sheet measured $3\times10^{-4}$ S/cm.

A polymer electrolyte formulated as described above can be prepared in very thin form without loss of mechanical integrity, conductivity, and mechanical strength. By virtue of introducing the above-described preferred methods, which produce excellent ionic conductivity and mechanical strength of the base polymer via the two polymer hybrid design and addition of high surface area alumina or silica, and improving the ionic conductivity of the polymer electrolyte by introducing plasticizer salts and ionically conductive glassy constituents into the base polymer, as thin as 1 micron or less can be manufactured simply by selective use of the various components of the polymer electrolyte. Such polymer electrolytes are not only thin, but also truly flexible; and the thinness of the structure allows the possibility of lower resistances than are available from liquid electrolytes absorbed in traditional polypropylene separators. Traditional separator materials are usually at least 25 microns thick, and the conductivity of the solvent electrolyte is usually about $10^{-3}$ to $10^{-2}$ S/cm at room temperature. The advantageous design of the new solid polymer electrolytes, however, makes possible thinner polymer electrolyte sections with effective resistance at least one-half of that observed in liquid electrolytes alone. For example, a liquid electrolyte with an ionic conductivity of $5\times10^{-3}$ S/cm absorbed in a 25 micron polypropylene separator has an effective resistance of about 0.5 ohm, while a 1 micron polymer electrolyte fabricated according to one of the methods of the invention, with an ionic conductivity of $5\times10^{-4}$ S/cm, has an effective resistance of only about 0.2 ohm. In addition, the thinness of the polymer electrolyte allows the film to be highly flexible. Although the foregoing examples are based on lithium anodes and salts, compositions and devices similar to these and based on sodium, potassium, magnesium, calcium, zinc, nickel, carbon, ion-insertion polymers, ion-insertion inorganic electrodes or tin oxide anode materials, and compatible metal salts would also be satisfactory.

Thin-Film Electrode Structures

Active Electrode Materials

An electrochemical cell with improved performance is constructed with a polymer electrolyte layer fabricated as described above, in combination with a superior anode and cathode. Each of the anode and the cathode active materials is selected from a group of materials that provides a very high capacity. The polymer electrolyte is used with any of a variety of positive electrode or cathode materials such as ion-insertion polymers and ion-insertion inorganic electrodes. Preferably the active cathode material is one chosen from a wide range of oxides, sulfides and selenides, or a member of another similar group. Some suitable cathodic materials include $MnO_2$, $LiMn_2O_4$, $Li_xMnO_2$, $MoS_2$, $MoS_3$, $MoV_2O_8$, $CoO_2$, $Li_xCoO_2$, $V_6O_{13}$, $V_2O_5$, $V_3O_8$, $VO_2$, $V_2S_5$, $TiS_2$, $NbSe_3$, $Cr_2O_5$, $Cr_3O_8$, $WO_3$, $Li_xNiO_2$, $Li_xNi_yCo_zO_2$, $Li_xNi_yMn_zO_2$, $Li_xCo_yMn_zO_2$, lithium doped electronically conducting polymers such as polypyrrole, polyaniline, polyacetylene, and the like. Methods of preparing active electrode materials and of coating the electrode substrate are discussed in more detail below and in the section entitled "Fabrication of a Thin Film Electrode."

The new highly conductive polymer electrolytes are also combinable with various negative electrodes (anodes) such as an alkali metal, alkaline earth metal, transition metal, ion-insertion polymers, ion-insertion inorganic electrodes, carbon insertion electrodes, tin oxide electrodes, among others. Preferably the active anode is lithium, sodium, potassium, magnesium, calcium, zinc, nickel, carbon or tin oxide. For highest energy density, lithium, carbon or sodium is preferred. Anode materials are discussed in more detail below, particularly in the section entitled "Half-Element Anodes."

Metal Substrates

As a substrate for one of the above-described active electrode materials, an ultra thin metal substrate is preferably employed for assembling a thin film lithium polymer electrolyte rechargeable battery. The preferred substrate thickness is less than 10 microns, and more preferably less than 5 microns. By contrast, conventional metal foils used for this purpose are typically thicker. At the present time the minimum thickness available for copper or aluminum foil is about 5 microns. The most preferred, thin designs of the new polymer electrolytes of this invention are preferably used together with very thin electrode elements to provide thinner electrode/electrolyte structures (e.g., <<5 microns/<<5 microns) with very large surface areas and very thin inactive current collectors. These electrode/electrolyte combinations can be fabricated at low cost. A thin layer of active electrode material about 0.1 to 100 microns thick is applied or adhered to the ultra thin metal substrate, as described below in the section entitled "Fabrication of a Thin Film Electrode."

Metallized Polymer Substrates

Figure 1B:
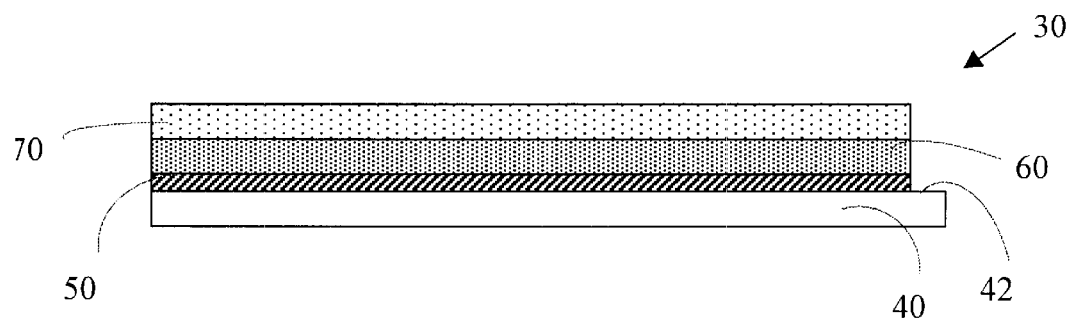
FIG. 1B also shows a metallized plain polymer film with an unmetallized margin and layers of active anode material and solid polymer electrolyte not on the margin.

Alternatively, the electrode/electrolyte structures may use metallized plastic or polymer substrate current collectors up to about 50 microns thick, preferably 1–10μ, instead of the above-described very thin metallic element. The polymer substrate of each of the anode and cathode is preferably selected from a group of polymers including polyester (PET), polypropylene (PP), polyethylene napthalate (PEN), polyethylene (PE), polyvinylidene fluoride (PVDF), polycarbonate (PC), polyphenylene sulfide (PPS) and polytetrafluoroethylene (PTFE). Other polymer materials that possess similar characteristics to these polymers could also be used and each polymer substrate is metallized to form the conductive layer thereon. The polymer substrate may be a plain polymer with a metallization layer and an unmetallized margin, as illustrated in FIGS. 1A and 1B. In FIG. 1A an anode 10 is shown. Metal layer 16 overlies plain polymer substrate 12, leaving an unmetallized margin 14. Over the metallized layer 16 is a thin coating of anode material 20, preferably lithium metal.

FIG. 1B shows a cathode 30 having a metallized plain polymer film 40 with an unmetallized margin 42 and layers of active cathode material 60 and solid polymer electrolyte 70. Metal layer 50 overlies plain polymer substrate 40, which may be like polymer substrate 12. Over metal layer 50 is a layer of active cathode material 60. Cathode material 60 does not extend onto the margin 42. On top of the cathode material 60 is a thin layer of solid polymer electrolyte 70, preferably containing a lithium salt. Electrolyte 70 also is not applied to the margin 42.

Figure 2:
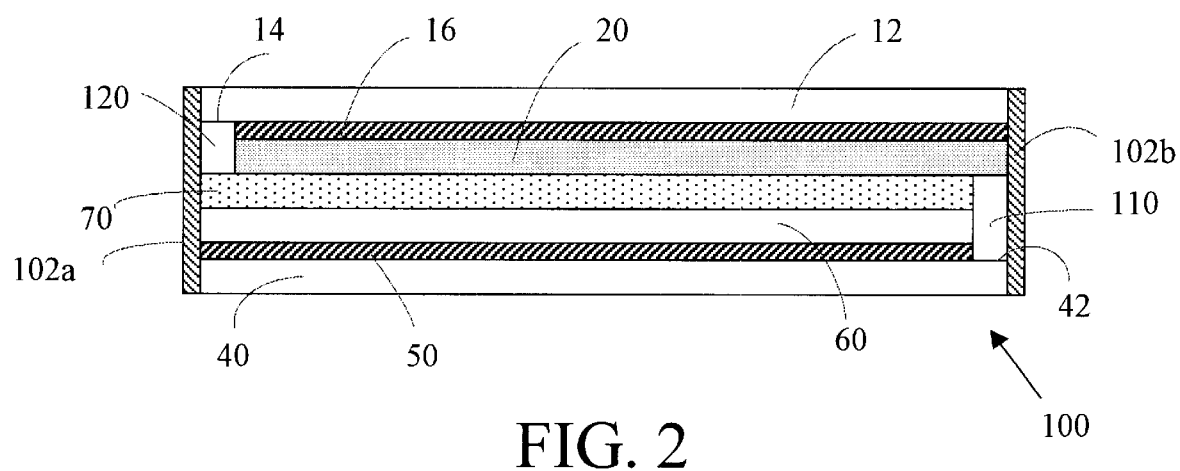
FIG. 2 shows the combined cathode, anode and electrolyte components of FIGS. 1A and 1B and a metallized end spray.
Figure 3:
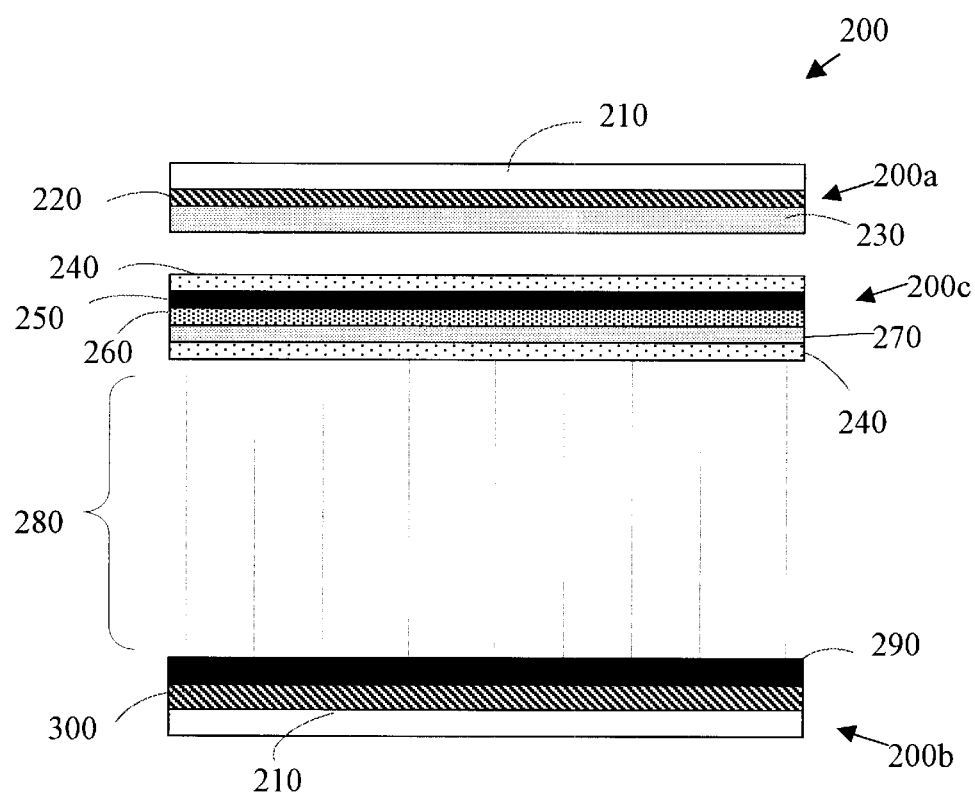
FIG. 3 shows the layers of a thin lithium polymer electrolyte bipolar battery cell.

Alternatively, the polymer substrate of an electrode may be impregnated with an electronically conductive element that is inert to the active electrode and metallized on both sides of the substrate without a margin (illustrated in FIG. 3). Such electronically conductive element could include conductive carbon, electronically conducting polymers, e.g., polyacetylene, polypyrrole, polyaniline, etc., or it could be finely ground, dispersed metal impregnated into the polymer substrate. The conductivity of these impregnated polymer substrates should be greater than $10^2$ S/cm. These designs of impregnated polymer substrates are particularly useful when the active electrode material is coated on both sides of the metallized plastic current collector or when bipolar half-elements are constructed. These impregnated polymer substrates are used in bipolar plates in a bipolar battery design and/or in monopolar battery design. In both cases, however, the electrode terminations are not end-sprayed, at the electrode edges, as shown in FIG. 2, but instead are end sprayed on the respective anode and cathode end units (not shown). It is preferable if the monopolar batteries do not have the impregnated polymer substrates so as to facilitate end-spraying for end terminations. However, the impregnated substrates are highly desirable for bipolar designs. When impregnated substrates are used, no unmetallized margins are included. In addition, metallization of the impregnated polymer substrate is optional. Typical metallization material is aluminum. However, copper, nickel, inconel, stainless steel, zinc, carbon, gold, or any compatible metallization with the overlying active electrode material will suffice. For lithium ion battery, it is preferable if the anode substrate is metallized with copper and the cathode substrate is metallized with aluminum. For lithium polymer electrolyte battery, it is preferable if the anode substrate is either nickel, aluminum or inconel and the cathode substrate is either nickel or aluminum, but another suitable metal could also be used. The polymer substrate layer ranges in thickness from 0.5 micron to greater than 50 microns, thereby rendering it very flexible for ease of coating and handling, to avoid kinking and deformation thereof, during manufacture of lithium polymer electrolyte batteries. The highly flexible substrate facilitates making a flexible electrode. The chosen thickness of the metallic layer depends upon the particular conductivity requirement and the desired resistivity of the metal.

In an exemplary lithium ion battery design, the active cathode material is coated on an aluminum metallized polymer. Such material has been found to have the resistivity (expressed as ohms per square) with thickness of the deposit as shown in Table 1 below.

TABLE 1

Resistivity as a Function of Metal Thickness for Aluminum

| Resistivity (ohms per square) | Metal Thickness (Angstrom) |
|---|---|
| 0.10 | 3000 |
| 0.30 | 1000 |
| 0.37 | 800 |
| 0.50 | 600 |
| 0.75 | 400 |
| 1.00 | 300 |
| 1.50 | 200 |
| 2.00 | 150 |
| 2.50 | 113 |
| 3.00 | 100 |

Resistivity as a function of copper thickness on metallized polyester is indicated in Table 2 below.

TABLE 2

Resistivity as a Function of Metal Thickness for Copper

| Resistivity (ohms per square) | Metal Thickness (Angstrom) |
|---|---|
| 0.1 | 1500 |
| 0.2 | 750 |
| 0.3 | 600 |
| 0.4 | 300 |
| 0.5 | 200 |
| 1.0 | 100 |

Each polymer substrate electrode material has different, easily identifiable, characteristics and thermal and mechanical properties, and each behaves differently depending upon its use. A suitable material can be readily selected based on the desired properties. Ideally, the thickness of the metal coating should be kept as thin as possible, while concurrently ensuring that its conductivity is very high. Preferably, the coating thickness has a conductivity of less than about 1.0 ohm per square, preferably less than 0.1 ohm per square, and more preferably about 0.01 ohm per square. This will ensure low resistance loss during current drain from the metallized substrate. The metallization may be present on only one side of the polymer layer or substrate, but is preferably provided on both sides thereof. Further, the metallization preferably is accomplished to leave an unmetallized (non-metallized) margin having a width in a range from about one millimeter (mm) to about three mm. Where the metallization is present at both sides of the polymer substrate, the non-metallization margin is provided at opposite sides of the polymer material, but on the same edge. When the substrate is coated with the active material, the coating material will be applied to the metallized portion and not the margin. The use of such substrates eliminates the use of additional carrier grids for the electrodes and instead, the metallized plastic current collector can serve the purpose of both the carrier grid for the electrodes and the battery enclosure—a major cost benefit and reducing the inactive component and making it lightweight and further increasing the energy density of the battery.

Fabrication of a Thin Film Electrode

The thin metal or metallized polymer substrate described above is coated with very thin film active anode and cathode material to complete an electrode structure that is thinner than known electrodes for thin polymer electrolyte electrochemical devices. Conventional calendaring of the anode and cathode from paste will not lead to the desired thickness. Instead, the active anode or cathode material is milled extensively in a solvent to reduce the particle size, and then injected directly onto the substrate and subsequently drawn into thin films of any of a variety of predetermined thicknesses. Preferably the finely divided electrode material is blended with the polymer electrolyte solution.

EXAMPLE 5

The polymer electrolyte solution of Example 4 was mixed with 20 g of $V_6O_{13}$ cathode active material and 0.7 g of acetylene black, and an additional 20 mls of acetonitrile, and the mixture milled for two days using zirconia grinding media. The cathode was cast directly onto aluminum sheets in thin film form (20 microns), the solvent evaporated and the dried cathode/polymer mix cured using electron beam radiation.

A number of different methods may be employed to cast or coat the active electrode material/polymer electrolyte composite from a solvent-based system. Some suitable methods include knife coaters, doctor blade coaters, screen-printing, wire-wound bar coaters or Mayer rods, air knife (or air doctor) coaters, squeeze roll or kiss coaters, gravure coaters, reverse roll coaters, cast film coaters, and transfer roll coaters. One coating system may be preferred over another to achieve a particular intended final result. For instance, coaters that apply an excess to the substrate web and remove the surplus coating, leaving a desired amount on the surface of the web are usually knife coaters, doctor blade coaters, bar or rod coaters, air knife coaters, and squeeze roll coaters. Coaters that apply a predetermined amount of coating to the web include reverse roll coaters, gravure coaters, and transfer roll coaters. Any of these methods could be suitable for coating dry polymer electrolyte film thickness in the range of about 2 to 100 microns.

One preferred technique for applying an electrode/polymer electrolyte composite material is to inject the electrode slurry with the finely dispersed inorganic and organic constituents directly onto the substrate, and then draw it out into a thin film of the desired thickness using wire wound rods (Mayer rods) with different wire diameters. The different diameter wire controls the wet slurry thickness. This method, and the other electrode deposition techniques described herein have not been used previously in the battery industry to manufacture electrodes. These methods greatly facilitate obtaining an electrode material/polymer electrolyte composite film that is extremely uniform, pinhole free, flexible and ultra-thin. Dry film thickness of 2 microns to more than 100 microns can be controlled using this process.

An alternative coating method includes incorporating each of the active electrode composites mixtures into its own aerosol mix and spraying an atomized aerosol of each material directly onto the respective opposite sides of the film substrate. This can be done rapidly while moving the substrate past the points of aerosol spray at high speed. The sprayed active electrolyte materials are cured either by drying or radiation, if the material contains radiation curable materials. Another alternative way of coating the substrate with active electrode material is to evaporate the respective electrode materials directly onto respective opposite sides of the substrate. In this case, it is preferred that the polymer electrolyte blend include a liquid radiation curable polymer capable of dissolving the metal salt and dispersing the inorganic materials. It is also preferred if inclusion of organic solvent in the electrolyte mixture can be avoided. Polymer electrolytes and active electrode/polymer electrolyte composites manufactured in this manner can result in final film thickness of less than 1 micron and more preferably in thickness of about 0.2 microns or less.

One advantage of these thinner electrode structures is that they undergo significantly less expansion and contraction during discharge and charge than is typical with other electrode structures in a battery. The polymeric structures within the battery (i.e., the metallized film substrates, and polymer film electrolyte) should also accommodate these phenomena. Since the composite cathode and anode structures must be as thin and smooth as possible, it is desirable to perform extensive, high speed, wet attrition milling of the electrode formulation. The electrode formulation preferably includes active cathode or anode material, conductive carbon, lithium salt, solvents, and a suitable binder, so as to obtain thin electrode films similar in consistency to audio and video magnetic tapes. Final particle size of the composite electrodes is less than 0.1 micron, and preferably less than 0.05 micron. This will ensure a very thin film and smooth electrode during the coating process.

Double-Metallized Electrode Structures

Figure 1C:
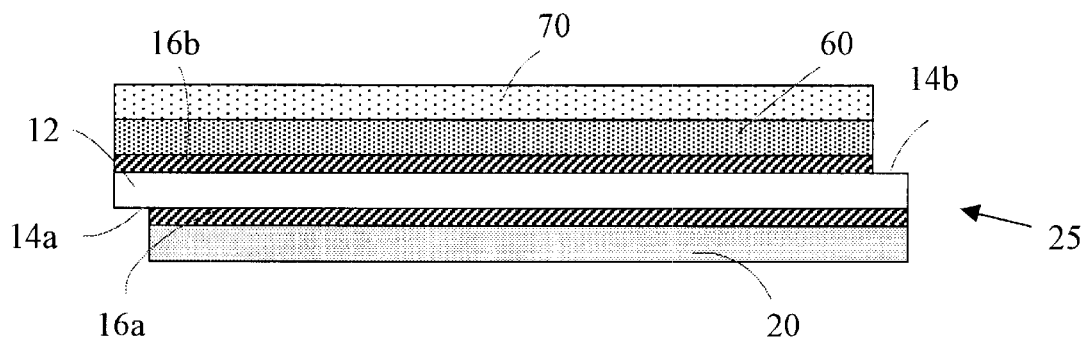
FIG. 1C illustrates an embodiment having a dual electrode structure.

As an alternative to the polymer substrate electrode structure of FIG. 1B, a preferred dual electrode structure 25 for a thin film lithium polymer electrolyte battery is fabricated by laminating anode 60 and cathode 20 elements on respective opposite sides of a double-metallized polymer substrate 13 to yield a highly flexible and strong electrode structure for the battery, as illustrated in FIG. 1C. Double-metallized polymer substrate 13 comprises polymer substrate 12 and metallization layers 16a and 16b. Non-metallized margins 14a, 14b are provided on each of the anode 60 and cathode 20 elements on the opposite sides of the metallized polymer substrate. Metal is sprayed on opposite ends of the laminated metallized polymer substrate for the battery terminations, similar to the manner of termination shown in FIG. 2. Employing double-metallized substrates instead of singly-metallized electrode substrates further reduces the final thickness of the electrode structures, providing a ratio of substrate thickness to active electrode thickness less than about 0.5, and surface resistivity for each anode and cathode elements of less than 0.1 ohms per square. It can be readily appreciated that for metallic anode or cathode elements, the surface resistivity will be significantly lower.

After the anode and cathode composite materials have been coated or laminated onto either an ultra-thin metallic or a metallized plastic current collector, as described above, the anode and cathode elements are coated directly by a thin solid polymer electrolyte. In the double metallized half cell shown in FIG. 1C, solid polymer electrolyte layer 70 is shown overlying anode 60. Application of the solid polymer electrolyte is preferably accomplished in a single-step operation using any of the various methods of depositing the electrolytes as described in related patent application Ser. No. 09/388,741, including casting, hot-melt extrusion, hot-melt pressing, and spraying.

Bipolar Electrode Structures

Still another alternative electrode structure employing a polymer substrate is the thin film bipolar element. A bipolar structure is fabricated by laminating anode and cathode active elements on respective opposite sides of a double-metallized substrate of the same polymer material as described in the previous section entitled "Metalized Polymer Substrates" and illustrated in FIG. 1C. For a preferred bipolar structure, however, the polymer substrate is impregnated with an electronically conductive material such as carbon black or metallic elements, which are inert to the active electrode, as in the bipolar unit shown in FIG. 3. The electronically conductive material is dispersed throughout the polymeric material of the substrate. This yields a highly flexible and strong electrode structure for the battery. Preferably the electrode layers are 0.1–100 microns. For bipolar structures, the composite active cathode or anode is preferably screen-printed onto the substrate element, but one of the above-described techniques for applying active electrode composite could also be used.

Half-Element Anodes

A strong and yet flexible half-element anode consisting of a layer of anode element is made by depositing the anode material onto a very thin metallized plastic or metallic current collector. For a lithium polymer electrolyte battery, this anode half-element is lithium metal that is preferably deposited via evaporation or sputtering technique directly onto an aluminum or nickel metallized plastic substrate or directly onto the metallic current collector (also Al or Ni) in a continuous step. Desired thickness of the plastic substrate is 0.5 to 50 microns while the desired resistivity of the metallization layer is less than 0.1 ohms per square, and the desired thickness of the lithium deposit is between 0.1 microns to 100 microns, and preferably between 0.1–10 microns. Another elemental electrode material could be substituted in place of lithium to create another type of anode battery. Lithium anodes manufactured in this manner are ultra-thin, flexible, easily handled, non-distortable, stronger and relatively inexpensive. Also, the precise capacity per unit area can be fabricated into the lithium anode composition for use in a lithium polymer electrolyte battery designed for a specific use requiring a defined battery capacity, a feature not possible with lithium metal foil anodes. This strong metallized polymer strip permits winding of the cell components in such a way that no distortion or damage to the lithium electrode occurs. Tabbing the lithium using metal punching through the polymer material allows greater strength than if thin film lithium is to be used alone. If even thinner lithium metal is desired, it is preferable to evaporate it directly onto the metallized plastic current collector. The polymer material provides strength during the tabbing and winding process as well as giving some backbone during the plating and stripping operation of the lithium during charge and discharge.

Very thin film battery electrode/electrolyte structures designed with very thin metallized polymer films (e.g., 1 micron) as the substrate material have several significant advantages. They make possible the fabrication of low resistance cells that can operate efficiently at the lower temperatures with significantly improved materials utilization, provide lower polarization with attendant greater energy efficiency and safety, and offer the potential for unprecedented cycle life of several tens of thousands of cycles from a bulk battery system.

Solid Polymer Electrochemical Cells and Batteries

Figure 4:
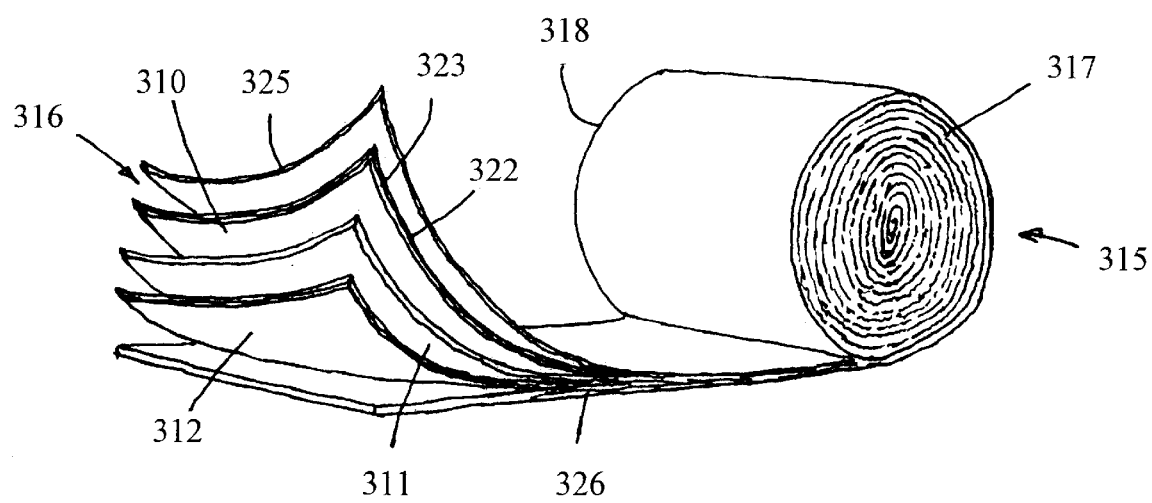
FIG. 4 illustrates a wound electrochemical cell for an ultra-thin battery employing layers similar to those of FIGS. 1A and 1B.

A variety of ultra-thin solid state lithium polymer electrolyte electrochemical cells may be fabricated using the very thin solid polymer electrolytes described elsewhere herein and in U.S. pat. app. Ser. No. 09/388,741, in combination with very thin electrode elements. Fabrication of a simple electrochemical cell includes laminating an anode half cell with a cathode half cell and placing a layer of solid polymer electrolyte having an initial conductivity of at least $10^{-3}$ to $10^{-4}$ S/cm between the half cells, as shown in FIG. 2. The cell may employ the thinnest possible inactive battery components with a solid polymer electrolyte. In one such design, both sides of an ultra-thin plastic or polymer substrate are laminated with the anode and cathode elements so as to yield a preferred ultra-thin, highly flexible electrode, as shown in FIG. 3. Alternatively, multiple layers may be wound together as shown in FIG. 4. Polymer electrolytes fabricated in very thin film form are tightly rolled with thin film anode and cathode electrodes. It is preferred that once the individual thin film cell components have been laminated, the finished cell is heated to about 60–80° C. for about 2 hours. This enhances the electrode/electrolyte interface and allows better interfacial adhesion and improved cyclability.

By designing an all-solid-state battery based on very thin film active and inactive components, one can effectively increase the surface area of the active plates. As a consequence, a battery will have a higher current drain capability, low resistance, higher energy content, low self-discharge, a wide operating temperature range, freedom from dendrite formation, higher efficiency, higher capacity utilization, higher cycle life, and better reliability and safety. Since there is less chance of lithium dendrite formation with the new solid polymer electrolytes, very thin polymer electrolyte membranes (e.g. 1–10μ) as the separator and ionic carrier are feasible.

Such a battery is also able to tolerate overcharge, without emission of any deleterious species or outgassing. Furthermore, when the battery design utilizes very thin metallized polymer films (e.g., about 1 micron) as the substrate material, the energy density improves by at least 100% over state-of-the-art lithium ion batteries. An especially desirable thin film lithium polymer electrolyte rechargeable battery includes an ultra thin film metallized polymer substrate about 0.5–50 microns thick. This substrate is used in conjunction with very thin film electrode and solid polymer electrolyte structures having thicknesses less than 0.5 microns. The thickness of the metallization layer on the polymer layer of the substrate is selected according to the predetermined desired conductivity of the metallization layer. The metallization layer ranges up to about 1 micron. For many applications the preferred thickness is about 0.01 micron or less.

Rechargeable Lithium Thin-Film Polymer Electrolyte Battery

EXAMPLE 6

The cathode from Example 5 was used to make a lithium bipolar battery. 10×10 cm sheets of the cathode were cut, a thin layer (10 microns) of the polymer electrolyte from Example 4 was cast directly onto the cathode, the solvent completely evaporated and the cathode/pre-cured polymer electrolyte cured using UV light. The cathode/polymer electrolyte was then laminated on the back side with 1 mil thick lithium metal foil of the same area to make a bipolar plate. Two bipolar plates constructed in the above manner and two half plates of lithium and cathode were then laminated together to form a 10 V bipolar battery. Once the individual cell components have been laminated, it is preferred to heat the finished cell to just above the melting point of the polymer electrolyte. This enhances the electrode/electrolyte interface and allows better interfacial adhesion and improved cyclability. Discharge of the battery was made at 100 mA at room temperature, and pulse currents of 1A were obtained for a duration of 10 seconds at a time.

A battery produced with all solid state components and polymer electrolytes, as exemplified above, demonstrating a room temperature ionic conductivity of at least $10^{-4}$ to $10^{-3}$ S/cm will be more stable during use and at elevated temperatures up to at least 150° C., will not outgas during overcharge, will have very low self-discharge because it is solid state, will be leakproof since there are no solvents in the system, will be very tolerant to overcharge reactions since there are no liquids to decompose, and hence will be very safe.

An ultra-thin battery according to one of the designs described herein, will better tolerate overcharge and will not lead to the emission of any deleterious species or outgassing. This is inherently provided by the fact that the polymer electrolyte is solid state. Since there are no liquid solvents within the solid polymer electrolyte, the inventor has observed that overcharge of batteries using solid polymeric electrolytes does not involve any gassing reactions. Instead the polymer merely degrades to a crystalline deposit. Hence, batteries constructed from such solid polymer electrolytes are safer than their liquid electrolyte counterparts.

In addition, the recycling of these batteries is expected to be relatively simpler than the recycling of lithium ion batteries—a major environmental benefit, especially when these batteries find use in portable electronics, telecommunications and mass electric transportation. It is also expected that the new battery technology, after more extensive testing, will prove itself to be safer than earlier technology batteries containing liquid organic solvents. Despite the fact that the polymer battery may contain lithium metal which is flammable, the fact that there are no liquid organic solvents in the battery to propagate the flammability of lithium metal and also the lithium is laminated tightly with the metallized polymer and other components of the battery will tend to limit flammability of the lithium metal. With no toxic compounds in the chemistry and no corrosive liquids in the battery (e.g. caustic in nickel-cadmium and nickel metal hydride batteries, sulfuric acid in lead acid batteries, organic solvents in lithium ion batteries) it is expected the battery will be relatively easier to handle, recycle, and less costly than many conventional battery systems. With mass usage, it is imperative that these batteries are recycled from the beginning since lithium is a costly element and not in abundant supply, as is the case with lead, nickel, or carbon. By comparison, the lithium ion battery is only recently being discussed for recycling, after being introduced eight years ago. With mass: usage of the new lithium polymer electrolyte batteries, recycling of this new technology will make a major economic and environmental difference to the world pollution problem. The inventor estimates that at least 20% of the battery cost could be recovered through recycling—a significant cost savings, especially when the market becomes mature with mass transportation applications and extensive electronics product usage.

Ultra-Thin Bipolar Batteries

An even thinner rechargeable solid polymer electrolyte battery can be fabricated with an anode half cell, a cathode half cell and at least one bipolar plate disposed therebetween. A bipolar battery has a common current collector for both the anode and the cathode and eliminates the use of one of the current collectors from each cell. For example, a lithium or cathode half cell may include a layer of the new polymer electrolyte composition with an initial ionic conductivity of at least $10^{-3}$ to $10^{-4}$ S/cm and containing at least one ionically conductive component base polymer material, a lithium salt, a high surface area inorganic filler such as alumina with an average particle size less than 0.05 microns and a surface area of at least 100 m$^2$/g dispersed in the polymer electrolyte, and a lithium ion glassy conductor having an average particle size of less than 0.1 micron also dispersed into the polymer electrolyte. Each bipolar unit also contains on one side a layer of ultra-thin polymer electrolyte as described above. In this way, a number of these anode-current collector-cathode/polymer electrolyte bipolar units can be combined to form a multi-cell/multi-voltage battery, with the end cells being a single anode/current collector and cathode/current collector half cell at either end of the bipolar units. Bipolar half-elements are best fabricated in rectangular units using spray deposition or screen-printing methods to form the electrode coatings as well as electrolyte coatings. This kind of design is also readily adaptable for an all-solid-state design, especially a flexible polymer electrolyte battery. Batteries can be stacked in rectangular prismatic modules or the stacks can be jelly-rolled to form a cylindrical battery of higher voltage than the individual cell voltage, as described in more detail in the following section. An ultra-thin battery assembly may be modified, if desired, by laminating the components into rolled or cylindrical geometries, or in a concertina configuration. Alternatively, the cylindrical geometry may be flattened after winding to form an oval shape, or flat-rectangular coupons could simply be laminated to form flat cells.

By reducing the lithium excesses described above for regular lithium metal cells incorporating liquid organic solvent electrolytes, and by incorporating very high surface area electrodes deposited on thin inactive substrates together ,with bipolar construction, the energy density of a battery can be increased to levels not previously available.

Ultra-thin Wound Battery

Three principal webs comprising anode 310, solid polymer electrolyte film 311 and cathode 312 are rolled or wound as illustrated in FIG. 4, to form lithium polymer electrolyte battery 315. Alternatively, the layers may be tightly stacked or laminated together. A tightly wound construction is preferred, in part because winding removes air from between the layers, and enhances creation and maintenance of continuous contact between the layers. The exercise of care in winding is essential to avoid electrical shorting of the beginning of the turns. This may be facilitated by staggering or offsetting the beginning of each layer. The conducting metallized layer deposited on the plastic film 326 may be too thin to be directly bonded to for termination purposes, so the rolled up laminate, resembling a "battery/capacitor hybrid," is taped at the edge 316, and may then be strapped in a tray (not shown) that is open on both sides. This provides access to both ends 317 and 318 of the battery 315 for schooping or, preferably, metal spraying of the roll ends, first with a high zinc content solder (harder material) followed by a regular softer "Babbitt" end spray solder (90% tin:10% zinc). The first end spray scratches the metallized surface and creates a trough to build a better electrical and mechanical contact. The tight winding and offset spacing of individual layers prevents the zinc from penetrating to the active components. This combination of end sprays also allows better contact adhesion with the final termination. The end spray also connects all the thin layers together, resulting in a continuous contact along the entire length of the film, in contrast to a cylindrical battery where only one lead contact is made at one end of the electrode. The first end spray coat (harder material) is employed in order to enhance heat transition during the schooping, to reduce shrinkage of the polymer and to increase the heat capacity on the metallized layer by providing a "heavy edge" which reinforces the metallization at the contact area.

Subsequently, aluminum leads (not shown) are soldered onto each of the ends 317 and 318 to form the final termination. The battery may then be packaged in a plastic case filled with epoxy, or conformally coated to maintain pressure on the cell, as well as to provide a hermetic seal to further protect it from humidity. This rolled laminate or battery-capacitor hybrid 315 is heated to about 80° C. for a period of from 2 to 5 minutes, to improve the interface. If desired, it may be heated under vacuum before epoxying, to improve the interface even further.

The anode and cathode elements are preferably laminated on both sides of a double-metallized polymer substrate material so as to yield a highly flexible electrode. By way of contrast, in a typical state-of-the-art lithium ion battery, a carbon anode is calendared on both sides of a copper current collector. In a thin film, flexible battery 315, as illustrated in FIG. 4, the lithium anode material 322 is laminated or coated in a very thin film on both sides of copper metallized polymer (e.g., PET) material 323 so that no distortion or damage to the lithium anode electrode will occur during the winding operation of the cell components. If even thinner electrode structures are desired, it is preferable that the electrode material be evaporated directly onto the metallized polymer. A similar structure (apart from the specific materials employed, e.g., aluminum rather than copper for the metallization) may exist for the cathode. An insulator sheet 325 and a metallized PET current collector 326 complete the assembly prior to winding.

In some cases, it is desirable that the coating of the anode and cathode be carried out with a margin (as shown in FIGS. 1A–C and FIG. 2), especially if the tabbing or current lead can be placed at the end of the rolled structure (FIG. 4). The use of metallized plastic substrates in thickness of less than 1 micron reduces the inactive components of the cell significantly, compared to state-of-the-art lithium ion polymer electrolyte battery substrate material, thereby increasing the energy density of the battery even further. In a typical prior technology lithium metal anode battery, the ratio of substrate thickness to electrode thickness is about 0.8 to 1. In batteries assembled as described above using thinner battery elements, reduction of the ratio of substrate thickness to electrode thickness to less than 0.5, in combination with reduced electrolyte thickness and reduced dead space at the top and bottom of the jelly roll structure, significantly improves the battery's energy density, rate capability, reliability, cycle life, and safety over prior art batteries.

High-Speed Manufacturing of Ultra-Thin Polymer Electrolyte Batteries

The new, thinner battery designs lend themselves to being mass manufactured at lower cost than conventional lithium ion batteries using rapid, automated fabrication techniques. A high-speed manufacturing process for making an ultra-thin, flexible, laminar battery includes winding a cathode sheet, such as that described in Example 5 into a roll and then extruding, spraying, screen-printing, or evaporating a uniform thin layer of a solid polymer electrolyte composition described above onto the cathode sheet while the cathode roll is drawn at a uniform rate by an uptake reel. The current collector may be ultra-thin metal instead of metallized plastic. In some embodiments, it is preferred that the cathode composite sheet have narrow margins along both longitudinal edges where the plastic substrate material is uncoated by the active cathode material and the polymer electrolyte, in order to facilitate battery completion. Next the polymer electrolyte composition is cured as the composite is continuously wound by an uptake reel, to yield a roll of cathode composite.

Similarly, a roll of flexible lithium anode sheet, which is preferably lithium deposited on aluminum or nickel metallized polyester, is wound onto a reel. A uniform thin layer of the solid polymer electrolyte composition may be applied to the lithium layer similar to the manner of coating the cathode. Alternatively, a mixture of pre-cured polymer, lithium salt, filler and ionic conductor is sprayed directly onto either the anode or cathode material traveling at high speed from one roll to another. Electron beam radiation is then applied to cure the in situ deposited polymer electrolyte. The pre-cured polymer electrolyte mixture atomizer is preferably adjustable to various settings in order to control the exact thickness of the deposit. In this way, solid polymer electrolyte thickness of less than 0.2 microns can be achieved. Another alternative way of depositing the electrolyte coating on an electrode is to cast the electrolyte composition from a solvent based mixture and then evaporate or recover the solvent for recycling, leaving behind a thin layer of the polymer electrolyte.

Then, while simultaneously unrolling the cathode composite and the anode laminate rolls, the two sheets are placed close together and laminated together so that the adjacent layers (i.e. flexible cathode substrate/cathode/electrolyte/lithium/flexible anode substrate are in continuous mutual contact and extraneous air is excluded from the resulting laminated cell. Another alternative way is to form the polymer electrolyte separately either through extrusion or casting, and wind the anode/polymer electrolyte/cathode in a roll-to-roll laminate form. In order to improve the interface between the layers, the laminated cell may be heated under conditions of low atmospheric pressure (vacuum). An end-spray is then applied to each end of the cylindrical cell so that tabs can be either welded or soldered to the end-spray, maintaining pressure on the cell to keep the laminated layers in close contact during subsequent use. The end spray also protects the cell from humidity. Using a high-speed manufacturing technology like that employed today in the film capacitor making industry, electrode and electrolyte materials having the above-described compositions can be manufactured in thickness of 1 micron, or even less, using an extrusion process. Alternatively, by spray-coating the polymeric materials onto the substrate, active electrode electrolyte layers can be made as thin as 0.2 micron. It is expected that the polymer electrolytes and electrodes disclosed herein will be mass produced at speeds of 500 meters per minute and in thickness of 0.2 to 100 microns for producing thin film rechargeable lithium polymer electrolyte batteries. A similar high-speed production process, using a continuous roll-to-roll winding of the various battery elements in the form of strong, thin sheets will reduce the cost of manufacturing laminar solid polymer electrolyte batteries significantly. Another important advantage of this high-speed method of production is that batteries are produced which contain more uniformly thick, pin-hole free electrolyte layers than is possible with conventionally produced polymer electrolyte batteries.

While the preferred embodiments of the invention have been shown and described, modifications thereof can be made by one skilled in the art without departing from the spirit and teachings of the invention. The embodiments described herein are exemplary only, and are not intended to be limiting. For instance, while certain preferred lithium solid polymer electrolytes, and lithium polymer electrolyte batteries, electrodes, and components thereof are emphasized in the description and examples, the methods and compositions of the invention can be readily extended to any battery chemistry, both primary and secondary to provide other superior performance batteries. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. An all-solid-state laminar electrochemical cell for a battery comprising:
   an anode layer about 0.1–100$\mu$ thick;
   a cathode layer about 0.1–100$\mu$ thick;
   an anode current collector about 0.5–50$\mu$ thick attached to said anode;
   a cathode current collector about 0.5–50$\mu$ attached to said cathode; and
   a layer of solvent free solid polymer electrolyte disposed between said anode arid cathode layers, said solvent free solid polymer electrolyte being a cationic conductor having a conductivity of at least $10^{-4}$ S/cm at 25° C. in the absence of solvent and comprising a mixture of
      a base polymer material comprising at least one ionically conductive polymer and having an initial conductivity of at least about $1 \times 10^{-5}$ S/cm at 25° C. when combined with a metal salts the absence of solvent;
      a metal salt;
      an inorganic filler having an average particle size <0.05 micron in diameter and a surface area of at least about 100 m$^2$/g; and.
      an ionic conducting material having an average particle size <0.1 micron in diameter and an initial ionic conductivity of at least $2 \times 10^{-3}$ S/cm at 25° C.

2. An all-solid-state laminar electrochemical cell for a battery comprising:
   an anode layer;
   a cathode layer;
   an anode current collector attached to said anode;
   a cathode current collector attached to said cathode; and
   a layer of solvent free solid polymer electrolyte disposed between said anode and cathode layers, said solid polymer electrolyte being a cationic conductor having a conductivity of at least $10^{-4}$ S/cm at 25° C. in the absence of solvent and comprising a mixture of
      a base polymer material comprising at least one ionically conductive polymer and having an initial conductivity of at least about $1 \times 10^{-5}$ S/cm at 25° C. in the absence of solvent when combined with a metal salt;

a metal salt;

an inorganic filler having an average particle size <0.05 micron in diameter and a surface area of at least 100 $m^2/g$; and an ionic conducting material having an average particle size <0.1 micron in diameter and an initial ionic conductivity of at least $2\times10^{-3}$ S/cm at 25° C.

3. The all-solid-state laminar electrochemical cell of claim 2 wherein said anode layer is about 0.1–100$\mu$ thick, said cathode layer is about 0.1–100$\mu$ thick, said anode and cathode current collectors are each 0.5–50$\mu$ thick and said solid polymer electrolyte is about 0.2–100$\mu$ thick.

4. The all-solid-state lair electrochemical cell of claim 2 wherein said anode is lithium, said metal salt is a lithium salt, and said ionic conducting material is a lithium ion conducting material.

5. The all-solid-state laminar electrochemical cell of claim 4 wherein said lithium salt is chosen from the group consisting of lithium hexafluorophosphate ($LiPF_6$), lithium perchlorate ($LiClO_4$), lithium tetrafluoroborate ($LiBF_4$), lithium hexafluoroarsenate (LiAsF6), lithium tetrachloroaluminate ($LiAlCl_4$), lithium trifluoromethanesulfonate ($LiCF_3SO_3$), lithium methide ($LiC(SO_2CF_3)_3$ and lithium bis(trifluoromethane sulfonyl) imide ($LiN(CF_3SO_2)_2$).

6. The all-solid-state laminar electrochemical cell of claim 2 wherein said base polymer material comprises at least two polymers, the first said polymer being an ionically conductive polymer, the monomers of which have a hetero atom with a lone pair of electrons available for the metal ions of a metal salt to attach to and move between during conduction, when said first polymer is mixed with a metal salt.

7. The all-solid-state laminar electrochemical cell of claim 6 wherein the composition of said base polymer material comprises about 1% to 99% (by weight of said base polymer material) of one polymer and the remainder of said base polymer material comprises at least one other polymer.

8. The all-solid-state laminar electrochemical cell of claim 6 wherein said first polymer is chosen from the group consisting of linear polymers, random copolymers, block copolymer, comb-branched block copolymers, network structures, single ion conductors, polyvinylidene fluoride or chloride and copolymers thereof, poly (chlorotrifluoroethylene), poly(ethylene-chlorotrifluoroethylene), and poly(fluorinated ethylene-propylene).

9. The all-solid-state laminar electrochemical cell of claim 8 wherein said first polymer is chosen from the group consisting of polyethylene oxide (PEO), oxymethylene linked PEO, PEO-PPO-PEO crosslinked with trifunctional urethane; poly(bis(methoxy-ethoxy-ethoxide))-phosphazene (MEEP); a trihydroxy linked PEO crosslinked with difunctional urethane, poly((oligo)oxyethylene) methacrylate-co-alkali metal methacrylate; polyacrylonitrile (PAN); polymethylmethacrylate (PMMA); polymethylacrylonitrile (PMAN); polysiloxanes and copolymers thereof, polyvinylidene fluoride or chloride and copolymers thereof, poly(chlorotrifluoro-ethylene), poly(ethylene-chlorotrifluoroethylene), poly(fluorinated ethylene-propylene), acrylate-based polymer, combinations of the foregoing polymers either condensed or crosslinked to form a different polymer, and physical mixtures of any of the foregoing polymers, provided said first polymer is combinable with a lithium salt such that the ionic conductivity of said first polymer is enhanced.

10. The all-solid-state laminar electrochemical cell of claim 8 wherein said second of said at least two polymers is more inert with respect to ionic conductivity and is mechanically stronger than said first polymer when each polymer is in the form of a thin film.

11. The all-solid-state laminar electrochemical cell of claim 10 wherein said second polymer is chosen from the group consisting of polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

12. The all-solid-state laminar electrochemical cell of claim 2 wherein said inorganic filler is chosen from the group consisting of fumed silica and alumina.

13. The all-solid-state laminar electrochemical cell of claim 2 wherein said ionic conducting material is chosen from the group consisting of glassy lithium ion conductors and ceramic lithium ion conductors.

14. The all-solid-state laminar electrochemical cell of claim 3 in a stacked configuration.

15. The all-solid-state laminar electrochemical cell of claim 3 having a conformable structure.

16. The all-solid-state laminar electrochemical cell of claim 3 in a wound configuration.

17. The all-solid-state laminar electrochemical cell of claim 3 wherein each said current collector is a very thin structure chosen from the group consisting of metallic elements less than 10$\mu$ thick and metallized plastics 0.5 to 50$\mu$ thick.

18. A defined capacity battery comprising the electrochemical cell of claim 2 wherein said anode layer comprises a defined quantity of an element chosen firm the group consisting of lithium, sodium, potassium, magnesium, calcium, zinc, carbon and nickel per unit area of said anode layer.

19. A leakproof battery comprising the all-solid-state laminar electrochemical cell of claim 2 in a moisture resistant covering.

20. An overcharge tolerant battery comprising the all-solid-state laminar electrochemical cell of claim 2.

21. The overcharge tolerant battery of claim 20 further comprising an overcharge indicator.

22. An orientation tolerant polymer electrolyte battery having an all-solid-state composition comprising the laminar electrochemical cell of claim 2.

23. An all-solid-state battery comprising the wound electrochemical cell of claim 16 wherein said cell comprises a cylindrical configuration having cylinder ends with metallic terminations.

24. The all-solid-state battery of claim 23 wherein said terminations comprise at least one end coating on said cylinder ends.

25. The all-solid-state battery of claim 24 further comprising a moisture-resistant covering.

26. The all-solid-state battery of claim 2 wherein said cell comprises a concertina configuration.

27. An all-solid-state lithium polymer electrolyte battery comprising:

a pair of spaced-apart flexible thin film electrodes, each said electrode comprising a layer of active electrode material overlying a polymer substrate having an adherent electrically conductive layer disposed thereon and/or having an electrically conductive material dispersed in said polymer substrate; and a resilient and flexible solvent free thin film solid polymer electrolyte tightly disposed between said pair of electrodes, said electrolyte having a conductivity of at least about $1\times10^{-4}$ S/cm at 25° C., in the absence of any solvent, and containing a mixture of:

at least two polymer, one of which is an ionically conductive polymer having an initial conductivity of at least about $1\times10^{-5}$ S/cm at 25° C. when combined with a lithium salt in the absence of solvent, said lithium salt, an inorganic filler having an average particle size <0.05 micron in diameter and a surface area of at least about 100 $m^2/g$, and a lithium ion conducting material having an average particle size <0.1 micron in diameter and an initial ionic conductivity of a t least 2×10⁻³ S/cm at 25° C.

28. The battery of claim 27 wherein said inactive polymer substrate of each said electrode comprises a polymer material selected from the group of polymers consisting of PET, PP, PPS, PEN, PVDF and PE.

29. The battery of claim 27 wherein said inactive polymer substrate is a metallized polymer substrate having a thin metallization layer as said adherent electrically conductive layer.

30. The battery of claim 29 wherein said metallized polymer substrate is about 0.5 to 50 microns thick and said thin metallization layer has a resistivity of about 0.01 to 1 ohm per square.

31. The battery of claim 29 wherein said metallized polymer substrate further comprises a first side containing a first non-metallized margin.

32. The battery of claim 31 wherein said non-metallized margin extends about 1 to 3 mm from an edge of said first side to an edge of said first metallization layer.

33. The battery of claim 32 further comprising a second metallization layer adhered to a second side of said polymer layer, said second side of said polymer layer comprising a second unmetallized margin extending about 1 to 3 mm from said edge to an edge of said second metallization layer.

34. In a lithium polymer electrolyte battery containing a lithium metal anode layer, a cathode layer, an anode current collector attached to said anode layer, a cathode current collector attached to said cathode layer, and a layer of lithium polymer electrolyte disposed between said anode and cathode layers, the improvement comprising substitution of a solvent free lithium solid polymer electrolyte having a conductivity of at least about $10^{-3}$ to $10^{-4}$ S/cm at 25° C. for said at least one polymer electrolyte layer, said lithium solid polymer electrolyte comprising a mixture of a polymer or polymer blend having an initial conductivity of at least about 1×10⁻⁵ S/cm at 25° C. when combined with a lithium salt in the absence of solvent, said lithium salt, an inorganic filler having an average particle size <0.05 micron in diameter and a surface area of at least about 100 m²/g, and a lithium ion conducting material having an average particle size <0.1 micron in diameter and an initial ionic conductivity of at least 2×10⁻³ S/cm at 25° C., the improved battery having a cell resistance less than or equal to that of a corresponding liquid electrolyte-containing lithium battery.

35. The improved lithium polymer battery of claim 34 wherein the improvement further comprises substitution for at least one said current collector an ultra-thin current collector chosen from the group consisting of metallic elements less than 10μ thick and metallized plastics 0.5 to 50μ thick.

36. The improved lithium polymer battery of claim 35 wherein the improvement further comprises substituting for at least one of said anode and cathode layers a flexible ultra thin film electrode containing a metallized polymer substrate having an inactive polymer layer about 0.5–50 microns thick, a metallization layer up to about 0.01 micron thick overlying said inactive polymer layer, and a layer of active electrode material up to about 5 microns thick overlying said metallization layer; and wherein said lithium solid polymer electrolyte is in the form of a thin film up to about 5 microns thick.

37. The battery of claim 36 wherein said filler is 0.1–20% (by volume of solid polymer electrolyte) high surface area filler having an average particle size ≦0.01 micron and chosen from the group consisting of fumed silica and alumina.

38. The battery of claim 36 wherein said lithium ion conducting material is 0.1–80% sulfide glass (by volume of solid polymer electrolyte).

39. The battery of claim 36 wherein said lithium ion conducting material is a ceramic ion conductor chosen from the group consisting of lithium beta alumina and silicates.

40. The battery of claim 34 wherein said cathode layer comprises a solid polymeric composite containing a mixture of active cathode material having an average particle size ≦0.1 micron; and a base polymer material comprising at least one ionically conductive polymer and having an initial conductivity of at least about 1×10⁻⁵ S/cm at 25° C. when combined with a metal salt in the absence of solvent;

a metal salt;

an inorganic filler having an average particle size <0.5 micron in diameter and a surface area of at least about 100 m²/g; and an ionic conducting material having an average particle size <0.1 micron in diameter and an initial ionic conductivity of at least 2×10⁻³ S/cm at 25° C.

41. A rechargeable all-solid-state lithium polymer electrolyte battery comprising:

an ultra thin lithium anode chosen from the group consisting of a metallic lithium element about 0.1 to 100 microns thick and a lithium metal layer about 0.1 to 100 microns thick over the metallization layer of a metallized polymer substrate, said metallized polymer substrate having an inactive polymer layer about 0.5 to 50 microns thick and a metallization layer up to 0.01μ thick overlying said inactive polymer layer;

an ultra thin film cathode layer containing a metallized polymer substrate said metallized polymer substrate having an inactive polymer layer about 0.5 to 50 microns thick and a metallization layer up to about 0.0μ thick overlying said inactive polymer layer, and a layer of active cathode material 0.1–100μ thick overlying said metallization layer; and a solvent free solid polymer electrolyte layer up to 5μ thick disposed between said anode and cathode layers, said lithium polymer electrolyte having a conductivity greater than 1×10⁻⁴ S/cm at 25° C. or below and comprising a mixture of a base polymer material comprising at least one ionically conductive polymer and having an initial conductivity of at least about 1×10⁻⁵ S/cm at 25° C. when combined with a lithium salt in the absence of solvent, said lithium salt, an inorganic filler having an average particle size <0.05 micron in diameter and a surface area of at least about 100 m²/g, and a lithium ion conducting material having an average particle size <0.1 micron in diameter and an initial ionic conductivity of at least2×10⁻³ S/cm at 25° C.

42. The rechargeable all-solid-state lithium polymer electrolyte battery of claim 41 wherein said polymer electrolyte comprises:

about 30 to 95% (by weight of solid polymer electrolyte) base polymer material comprising at least one ionically conductive polymer and having an initial conductivity of at least about $1\times10^{-5}$ S/cm at 25° C. when combined with a lithium salt in the absence of solvent;

about 1 to 25% (by weight of Solid polymer electrolyte) said lithium salt;

about 0.1–80% (by volume of solid polymer electrolyte) inorganic filler having an average particle size <0.05 micron in diameter and a surface area of at least about 100 m²/g; and about 0.1–60% (by volume of solid polymer electrolyte) ionic conducting material having an average particle size <0.1 micron in diameter and an initial ionic conductivity of at least $2\times10^{-3}$ S/cm at 25° C.

43. The rechargeable all-solid-state lithium polymer electrolyte battery of claim 42 wherein the concentration of said inorganic filler is about 0.1–20% (by volume of solid polymer electrolyte) and the concentration of said ionic conducting material is about 0.1–20% (by volume of solid polymer electrolyte).

44. A method of making an ultra-thin solid polymer electrochemical cell comprising:

preparing an anode sheet by applying active anode material to an inactive anode substrate such that the ratio of anode substrate thickness to anode sheet thickness is ≦0.8 and the conductivity is ≦0.1 ohms per square;

preparing a cathode sheet by applying active cathode material to an inactive cathode substrate such that the ratio of cathode substrate thickness to cathode sheet thickness is ≦0.8 and the conductivity is ≦0.1 ohms per square;

preparing a solvent free solid polymer electrolyte having a conductivity of at least $10^{-4}$ S/cm at 25° C., said preparing comprising mixing together a polymer or polymer blend having an initial conductivity of at least about $1\times10^{-5}$ S/cm at 25° C. when combined with a lithium salt in the absence of solvent, said lithium salt, an inorganic filler having an average particle size <0.05 micron in diameter and a surface area of at least about 100 m²/g, a lithium ion conducting material having an average particle size <0.1 micron in diameter and an initial ionic conductivity of at least $2\times10^{-3}$ S/cm at 25° C., an organic solvent, a curing agent;

coating said cathode sheet with said solid polymer electrolyte, evaporating said solvent, and then curing said polymer electrolyte to yield a solvent free solid polymer electrolyte-coated cathode sheet;

laminating said electrolyte-coated cathode sheet and said anode sheet together such that said electrolyte coat is between said cathode active material and said anode active material, whereby a cathode/electrolyte/anode laminate is formed;

optionally winding said laminate; and optionally shaping said laminate.

45. The method of claim 44 wherein said step of preparing an anode sheet comprises applying active anode material to an inactive anode substrate containing an inactive polymer substrate and a thin metallization layer overlying at least a portion of said polymer substrate, such that the ratio of anode substrate thickness to anode sheet thickness is ≦0.8 and the conductivity is ≦0.1 ohms per square; and said step of preparing a cathode sheet comprises applying active cathode material to an inactive cathode substrate containing an inactive polymer substrate and a thin metallization layer overlying at least a portion of said polymer substrate, such that the ratio of cathode substrate thickness to cathode sheet thickness is ≦0.8 and the conductivity is ≦0.1 ohms per square.

46. A method of making a thin bipolar battery comprising laminating tightly together at least one layer of bipolar unit between a layer of first anode and a layer of first cathode to provide a stack having laminar ends, said bipolar unit comprising a flexible first polymer substrate about 0.5–50$\mu$ thick and having two opposite sides and two opposite edges, said first polymer substrate including an electrically conductive material dispersed herein;

a 0.1–100$\mu$ thick second anode layer overlying one said side;

a 0.1–100$\mu$ thick second cathode layer overlying the other said side, the ratio of substrate thickness to second anode or second cathode layer thickness being less than about 0.5, and the surface resistivity for each said second anode and second cathode layer being less than 0.1 ohms per square;

optionally, a metallization layer up to 1$\mu$ thick disposed between said anode layer and said one side, and a metallization layer up to 1$\mu$ thick disposed between said cathode layer and said other side; and a layer of solvent free solid polymer electrolyte overlying at least one of said second anode layer and said second cathode layer, said solid polymer electrolyte having a conductivity of at least $10^{-4}$ S/cm at 20° C. and comprising a mixture of a base polymer material comprising at least one ionically conductive polymer and having an initial conductivity of at least about $1\times10^{-5}$ S/cm at 25° C. when combined with a metal salt in the absence of solvent, a metal salt, an inorganic filler having an average particle size <0.05 micron in diameter and a surface area of at least about 100 m²/g, and an ionic conducting material having an average particle size <0.1 micron in diameter and an initial ionic conductivity of at least $2\times10^{-3}$ S/cm at 25° C.;

said first anode comprising a 0.1–100$\mu$ thick layer of elemental anode material overlying a current collector chosen from the group consisting of:

metallic current collectors about 1–10$\mu$ thick, and metallized polymer current collectors comprising a second polymer substrate about 0.5–100$\mu$ thick and a metallization layer up to about 1$\mu$ thick overlying said second substrate, and a layer of said solid polymer electrolyte overlying said layer of elemental anode material, and said first cathode comprising:

a 0.1–100$\mu$ thick layer of cathode material overlying a current collector chosen from the group consisting of:

metallic current collectors about 1–10$\mu$ thick, and metallized polymer current collectors about 0.5–50$\mu$ thick comprising a polymer substrate and a metallization layer up to about 1$\mu$ thick, orienting said first anode and first cathode such that said first anode elemental material opposes said active cathode substance of said second cathode of a bipolar unit, with a layer of solid polymer electrolyte disposed therebetween; and applying terminations to said first anode and first cathode.

47. A high-speed manufacturing method for producing an ultra-thin laminar battery, the method comprising:

winding a 0.1–100µ thick cathode sheet into a roll, said cathode sheet comprising a flexible inactive polymer substrate and a layer of active cathode material overlying said substrate, said substrate optionally including an uncoated margin along a longitudinal edge of said substrate;

extruding a uniform layer of a lithium polymer electrolyte composition onto said cathode sheet while said roll is drawn at a uniform rate by an uptake reel, to obtain a roll of flexible substrate/active cathode/electrolyte composite, said lithium polymer electrolyte comprising a mixture of a base polymer material comprising at least one ionically conductive polymer and having an initial conductivity of at least about $1 \times 10^{-5}$ S/cm at 25° C. when combined with a lithium salt in the absence of solvent, said lithium salt, an inorganic filler having an average particle size <0.05 micron in diameter and a surface area of at least about 100 m$^2$/g, and a lithium ion conducting material having an average particle size <0.1 micron in diameter and an initial ionic conductivity of at least $2 \times 10^{-3}$ S/cm at 25° C.;

removing organic solvent, if any, from said extruded electrolyte composition and then curing said extruded polymer electrolyte composition as said composite is continuously wound by said uptake reel, to yield a roll of solvent-free cathode/electrolyte laminate;

winding a lithium anode sheet to provide a roll of anode laminate, said lithium anode sheet comprising a 0.1–100µ thick layer of elemental anode material overlying a current collector chosen from the group consisting of:

metallic current collectors about 1–10µ thick, and metallized polymer current collectors comprising a polymer substrate about 0.5–50µ thick and a metallization layer up to about 1µ thick overlying said polymer substrate;

winding a 0.5–50µ thick sheet of inert plastic to provide a first roll of plastic;

winding a 0.5–50µ thick sheet of inert plastic to provide a second roll of plastic;

while simultaneously unrolling said rolls of cathode/electrolyte laminate, anode laminate and first and second rolls of plastic, laminating said cathode/electrolyte laminate and said anode laminate together, between layers of said plastic sheet, whereby adjacent layers of plastic sheet/cathode/electrolyte/lithium anode/plastic sheet are in continuous mutual contact and extraneous air is excluded from between the layers, whereby a cylindrical laminated cell having first and second electrode edges is obtained;

applying a current collector to each said edge;

attaching leads to the respective current collectors;

maintaining pressure on said laminated cell;

optionally heating said laminated cell;

optionally applying a vacuum to said laminated cell during said heating; and hermetically sealing said cell.

48. The method of claim 47 wherein said extruding step comprises extruding a uniform thin layer of said solid polymer electrolyte composition onto said cathode sheet in such a manner as to leave an uncovered margin on said substrate along a longitudinal edge of said substrate.

49. The method of claim 47 further comprising heating said laminated cell and, optionally, applying a vacuum during said heating.

* * * * *